(12) United States Patent
Zheng et al.

(10) Patent No.: US 11,538,229 B2
(45) Date of Patent: Dec. 27, 2022

(54) IMAGE PROCESSING METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventors: Yuanli Zheng, Shenzhen (CN); Zhaopeng Gu, Shenzhen (CN); Nianhua Xie, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/185,393

(22) Filed: Feb. 25, 2021

(65) Prior Publication Data

US 2021/0183165 A1  Jun. 17, 2021

Related U.S. Application Data

(63) Continuation of application No. PCT/CN2020/111638, filed on Aug. 27, 2020.

(30) Foreign Application Priority Data

Sep. 10, 2019 (CN) .......................... 201910854877.X

(51) Int. Cl.
  *G06T 19/20* (2011.01)
  *G06T 7/73* (2017.01)
  *G06N 3/04* (2006.01)

(52) U.S. Cl.
  CPC .............. *G06T 19/20* (2013.01); *G06N 3/04* (2013.01); *G06T 7/75* (2017.01);
  (Continued)

(58) Field of Classification Search
  CPC ..... G06T 7/70; G06T 7/73; G06T 7/74; G06T 7/75; G06T 2207/30244; G06T 19/006;
  (Continued)

(56) References Cited

U.S. PATENT DOCUMENTS

2003/0028432 A1   2/2003 Troyansky et al.
2008/0012988 A1*  1/2008 Baharav .............. H04N 21/254
                                                  375/E7.006
(Continued)

FOREIGN PATENT DOCUMENTS

CN   101512553 A   8/2009
CN   103024480 A   4/2013
(Continued)

OTHER PUBLICATIONS

Liu et al., "PlaneNet: Piece-wise Planar Reconstruction from a Single RGB Image", Computer Vision Foundation (Year: 2018).*
(Continued)

*Primary Examiner* — Diane M Wills
(74) *Attorney, Agent, or Firm* — Crowell & Moring LLP

(57) ABSTRACT

The present disclosure provides an image processing method and apparatus, an electronic device, and a computer-readable storage medium. The method includes: obtaining a to-be-processed video comprising m frames of images, m being a positive integer greater than or equal to 2; placing a three-dimensional model on a target plane of a first frame of image of the to-be-processed video, a plurality of feature points of a model surface of the three-dimensional model falling on the target plane; determining three-dimensional coordinates of the plurality of feature points of the model surface in a world coordinate system and pixel coordinates of the plurality of feature points of the model surface on the first frame of image; determining, according to the three-dimensional coordinates of the plurality of feature points of
(Continued)

the model surface in the world coordinate system and the pixel coordinates of the plurality of feature points of the model surface on the first frame of image, a pose of a camera coordinate system of the first frame of image relative to the world coordinate system; determining, according to the target plane, the three-dimensional coordinates of the plurality of feature points of the model surface in the world coordinate system, and the pixel coordinates of the plurality of feature points of the model surface on the first frame of image, poses of camera coordinate systems of a second frame of image to an $m^{th}$ frame of image of the to-be-processed video relative to the world coordinate system; and replacing the three-dimensional model with a target model and placing the target model on the world coordinate system to generate, according to the pose of the camera coordinate system of each frame of image of the to-be-processed video relative to the world coordinate system, a target video comprising the target model.

17 Claims, 12 Drawing Sheets

(52) U.S. Cl.
CPC ............... *G06T 2207/20084* (2013.01); *G06T 2219/2004* (2013.01); *G06T 2219/2016* (2013.01)

(58) Field of Classification Search
CPC .. G06T 19/20; G06T 2207/20084; G06N 3/02
See application file for complete search history.

(56) References Cited

U.S. PATENT DOCUMENTS

2018/0295347 A1   10/2018   Ishimaru et al.
2019/0102647 A1*  4/2019   Yang ..................... G02B 27/017
2019/0197709 A1*  6/2019   Windmark .............. G06T 7/248

FOREIGN PATENT DOCUMENTS

| | | |
|---|---|---|
| CN | 106097457 A | 11/2016 |
| CN | 107016704 A | 8/2017 |
| CN | 107665506 A | 2/2018 |
| CN | 108629843 A | 10/2018 |
| CN | 109410680 A | 3/2019 |
| CN | 110213629 A | 9/2019 |
| CN | 110599605 A | 12/2019 |
| JP | 2019-220032 A | 6/2019 |

OTHER PUBLICATIONS

International Search Report and Written Opinion for International Application No. PCT/CN2020/111638 dated Nov. 30, 2020; 10 pages.
Office Action with English Translation of Concise Explanation of Relevance for Chinese Patent Application No. 201910854877.X dated Mar. 3, 2021; 12 pages.
Extended European Search Report for European Patent Application No. 20863666.2 dated May 10, 2022, 9 pages.
Rawia Frikha et al., "Camera pose estimation for augmented reality in a small indoor dynamic scene", Journal of Electronic Imaging, SPIE—International Society for Optical Engineering, US, vol. 26, No. 5, Sep. 1, 2017 (Sep. 1, 2017), pp. 053029-1-053029-11.
Christian Pirchheim et al., "Homography-Based Planar Mapping and Tracking for Mobile Phones", IEEE International Symposium on Mixed and Augmented Reality (ISMAR), Oct. 26, 2011 (Oct. 26, 2011), pp. 27-36.
Office Action with English Translation of Notice of Reasons for Refusal for Japanese Patent Application No. 2021-555830 dated Oct. 7, 2022, 5 pages.

* cited by examiner (a) (b) (c)

IMAGE PROCESSING METHOD AND APPARATUS, ELECTRONIC DEVICE, AND COMPUTER-READABLE STORAGE MEDIUM

RELATED APPLICATION

This application is a continuation application of the International PCT Application No. PCT/CN2020/111638, filed with the China National Intellectual Property Administration, PRC on Aug. 27, 2020 which claims priority to Chinese Patent Application No. 201910854877.X, filed with the China National Intellectual Property Administration, PRC on Sep. 10, 2019, both of which are incorporated herein by reference in their entireties

FIELD OF THE TECHNOLOGY

The present disclosure relates to the field of computer and communication technologies, and specifically, to an image processing method and apparatus, an electronic device, and a computer-readable storage medium.

BACKGROUND OF THE APPLICATION

In-video advertisement is a technology of intelligently placing an advertisement in a produced video by using a computer vision (CV) technology. Compared with conventional video technologies such as adding an advertisement to the beginning/end of a video or displaying an advertisement on a floating layer on a video, the in-video advertisement has advantages such as better user experience and higher traffic coverage, and has become a focus of technological development.

The information disclosed in the above background part is only used for enhancing the understanding of the background of the present disclosure, and therefore may include information that does not constitute the related art known to a person of ordinary skill in the art.

SUMMARY

Embodiments of the present disclosure provide an image processing method and apparatus, an electronic device, and a computer-readable storage medium, which can improve the efficiency and effect of placing an external object, such as a displaylink model, in a video.

Other features and advantages of the present disclosure will be apparent through the following detailed description, or learned through practice of the present disclosure.

According to an aspect of the present disclosure, an image processing method is provided, including: obtaining a to-be-processed video, the to-be-processed video including m frames of images, m being a positive integer greater than or equal to 2; placing a target three-dimensional model on a target plane of a first frame of image of the to-be-processed video, a plurality of feature points of a model surface of the target three-dimensional model falling on the target plane; determining three-dimensional coordinates of the plurality of feature points of the model surface in a world coordinate system and pixel coordinates of the plurality of feature points of the model surface on the first frame of image; determining, according to the three-dimensional coordinates of the plurality of feature points of the model surface in the world coordinate system and the pixel coordinates of the plurality of feature points of the model surface on the first frame of image, a pose of a camera coordinate system of the first frame of image relative to the world coordinate system; determining, according to the target plane, the three-dimensional coordinates of the plurality of feature points of the model surface in the world coordinate system, and the pixel coordinates of the plurality of feature points of the model surface on the first frame of image, poses of camera coordinate systems of a second frame of image to an $m^{th}$ frame of image of the to-be-processed video relative to the world coordinate system; and replacing the target three-dimensional model with a target model and placing the target model on the world coordinate system to generate, according to the pose of the camera coordinate system of each frame of image of the to-be-processed video relative to the world coordinate system, a target video including the target model.

According to an aspect of the present disclosure, an image processing apparatus is provided, including: a to-be-processed video obtaining module, configured to obtain a to-be-processed video, the to-be-processed video including m frames of images, m being a positive integer greater than or equal to 2; a three-dimensional model placing module, configured to place a target three-dimensional model on a target plane of a first frame of image of the to-be-processed video, a plurality of feature points of a model surface of the target three-dimensional model falling on the target plane; a first coordinate determining module, configured to determine three-dimensional coordinates of the plurality of feature points of the model surface in a world coordinate system and pixel coordinates of the plurality of feature points of the model surface on the first frame of image; a first pose determining module, configured to determine, according to the three-dimensional coordinates of the plurality of feature points of the model surface in the world coordinate system and the pixel coordinates of the plurality of feature points of the model surface on the first frame of image, a pose of a camera coordinate system of the first frame of image relative to the world coordinate system; a second pose determining module, configured to determine, according to the target plane, the three-dimensional coordinates of the plurality of feature points of the model surface in the world coordinate system, and the pixel coordinates of the plurality of feature points of the model surface on the first frame of image, poses of camera coordinate systems of a second frame of image to an $m^{th}$ frame of image of the to-be-processed video relative to the world coordinate system; and a target video generating module, configured to replace the target three-dimensional model with a target model and place the target model on the world coordinate system to generate, according to the pose of the camera coordinate system of each frame of image of the to-be-processed video relative to the world coordinate system, a target video including the target model.

According to an aspect of the embodiments of the present disclosure, a computer-readable storage medium is provided, storing a computer program, the program, when executed by a processor, implementing the image processing method according to the foregoing embodiments.

According to an aspect of the embodiments of the present disclosure, an electronic device is provided, including: one or more processors; and a storage apparatus, configured to store one or more programs, the one or more programs, when executed by the one or more processors, causing the one or more processors to implement the image processing method according to the foregoing embodiments.

In technical solutions provided in some embodiments of the present disclosure, on one hand, a target three-dimensional model is placed in a first frame of image of a to-be-processed video. The target three-dimensional model is placed on a target plane in the first frame of image, and a pose of the target three-dimensional model in the first frame of image relative to a camera coordinate system is calculated. By tracking the target plane, a pose of the target three-dimensional model in each following frame of image of the to-be-processed video relative to a camera coordinate system may be calculated, and then, by replacing the target three-dimensional model in the to-be-processed video with a target model, the target model may be automatically placed on each frame of image of the to-be-processed video. On the other hand, the target plane is tracked. Such a manner does not rely on the calculation on feature points of images in the to-be-processed video nor requires a video with a large parallax, which results in a small calculation amount, a fast speed, convenient operation, and high accuracy, and may be applied to more videos, thereby improving the efficiency and effect of placing the target model in the video.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. The accompanying drawings in the following description show merely some example embodiments of the present disclosure, and a person of ordinary skill in the art may still derive other drawings from these accompanying drawings without creative efforts. In the accompanying drawings.

DESCRIPTION OF EMBODIMENTS

Figure 1:
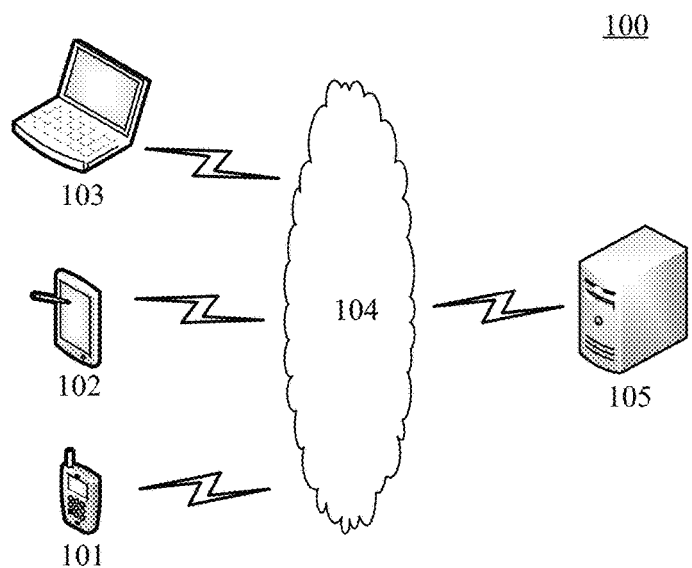
FIG. 1 is a schematic diagram of an exemplary system architecture to which an image processing method or an image processing apparatus according to embodiments of the present disclosure may be applied.

Exemplary implementations are described comprehensively with reference to the accompanying drawings. However, the exemplary implementations may be implemented in a plurality of forms, and are not limited to the examples described herein. On the contrary, such implementations are provided to make the present disclosure more comprehensive and complete, and fully convey the concepts of the exemplary implementations to a person skilled in the art.

In addition, the described features, structures, or characteristics may be combined in one or more embodiments in any appropriate manner. In the following descriptions, a lot of specific details are provided to give a comprehensive understanding of the embodiments of the present disclosure. However, a person of skill in the art is to be aware that, the technical solutions in the present disclosure may be implemented without one or more of the particular details, or another method, element, material, apparatus, step, and the like may be used. In other cases, well-known methods, apparatuses, implementations, or operations are not shown or described in detail, in order not to obscure the aspects of the present disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, and some operations/steps may be combined or partially combined. Therefore, an actual execution order may be changed according to the actual situation.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including hardware-level technology and software-level technology. The basic AI technology generally includes technologies such as sensor, dedicated AI chip, cloud computing, distributed storage, big data processing technology, operating/interaction system, and electromechanical integration. The AI software technology mainly includes several major directions such as Computer Vision (CV), speech processing, natural language processing, and machine learning/deep learning.

The CV technology is a science that studies how to use a machine to "see", and furthermore, is machine vision that a camera and a computer are used for replacing human eyes to perform recognition, tracking, measurement, and the like on a target, and to further perform graphic processing, so that the computer processes the target into an image more suitable for human eyes to observe, or an image transmitted to an instrument for detection. As a scientific subject, CV studies related theories and technologies to establish an AI system that can obtain information from images or multi-dimensional data. The CV technology generally includes technologies such as image processing, image recognition, image semantic understanding, image retrieval, optical character recognition (OCR), video processing, video semantic understanding, video content/behavior recognition, three-dimensional object reconstruction, a 3D technology, virtual reality (VR), augmented reality (AR), synchronous positioning, and map construction, and further include biological feature recognition technologies such as common face recognition and fingerprint recognition.

Machine learning (ML) is a multi-field interdisciplinary subject involving the probability theory, statistics, the approximation theory, convex analysis, the algorithm complexity theory, and the like, which specializes in the study of how a computer simulates or implements learning behavior of humans to obtain new knowledge or skills, and reorganize an obtained knowledge structure to keep improving its performance. ML is a core of AI and a fundamental way to make the computer intelligent, and is applicable to various fields of AI. ML and deep learning generally include technologies such as artificial neural network, belief network, reinforcement learning, transfer learning, inductive learning, and teaching learning.

A blockchain is a new application mode of computer technologies such as distributed data storage, point-to-point transmission, consensus mechanism, and encryption algorithm. The blockchain is essentially a decentralized database and a series of associated data blocks generated in a cryptographic manner. Each data block includes information about a batch of network transactions for verifying the validity of the information (for anti-counterfeiting) and generating a next block. The blockchain may include an underlying blockchain platform, a platform product service layer, and application service layer.

The underlying blockchain platform may include user management, basic service, smart contract, operation monitoring, and other processing modules. The user management module is responsible for identity information management of all blockchain participants, including maintenance of public and private key generation (account management), key management, and maintenance of a correspondence between a real identity of a user and a blockchain address (authority management), and when authorized, supervising and auditing transactions of some real identities and providing rule configuration for risk control (risk control audit). The basic service module is deployed on all blockchain node devices to verify the validity of service requests, and record valid requests in a storage after consensus. For a new service request, the basic service module first performs interface adaption analysis and authentication processing (interface adaption), and then encrypts service information by using a consensus algorithm (consensus management), and after the encryption, the information is completely and consistently transmitted to a shared ledger (network communication), and is recorded and stored. The smart contract module is responsible for contract registration and issuance, contract triggering, and contract execution. Developers may define contract logic through a specific programming language and publish the logic on the blockchain (contract registration). According to the logic of contract terms, the smart contract module completes the contract logic by invoking a key or when triggered by another event, which also provides functions of contract upgrade and cancellation. The operation monitoring module is mainly responsible for deployment during the product release process, configuration modification, contract settings, cloud adaptation, and visual outputting of a real-time status during product operation, for example, warning, monitoring network conditions, and monitoring health status of the blockchain node devices.

The platform product service layer provides basic capabilities and implementation frameworks for typical applications. Based on the basic capabilities, the developers may superimpose service characteristics to complete a blockchain implementation of the service logic. The application service layer provides application services based on a blockchain solution for service participants to use.

The solutions provided in the embodiments of this disclosure relate to CV and ML of AI, blockchain, and other technologies, which are specifically described by using the following embodiments.

FIG. 1 is a schematic diagram of an exemplary system architecture 100 to which an image processing method or an image processing apparatus according to embodiments of the present disclosure may be applied.

As shown in FIG. 1, the system architecture 100 may include one or more of terminal devices 101, 102, and 103, a network 104, and a server 105. The network 104 is configured to provide a communication link between the server 105 and the terminal devices 101, 102, and 103. The network 104 may include various connection types, such as a wired or wireless communication link, or a fiber optic cable.

It is to be understood that the quantities of terminal devices, networks, and servers in FIG. 1 are only schematic. There may be any quantities of terminal devices, networks and servers according to an actual requirement. For example, the server 105 may be a server cluster that includes a plurality of servers.

Users may use the terminal devices 101, 102, and 103 to interact with the server 105 via the network 104 to receive or send messages or the like. The terminal devices 101, 102, and 103 may be various electronic devices, including but not limited to a wearable intelligent device, a VR device, a smart household device, a smartphone, a tablet computer, a portable computer, a desktop computer, a digital movie projector, and the like.

The server 105 may be a server that provides various services. For example, a user uses the terminal device 103 (which may alternatively be the terminal device 101 or 102) to open a to-be-processed video, drag a target three-dimensional model onto a first frame of image of the to-be-processed video, and adjust a pose of the target three-dimensional model so that a plurality of feature points of a model surface of the target three-dimensional model fall on a target plane of the first frame of image. The to-be-processed video includes m frames of images, m being a positive integer greater than or equal to 2. The user uses the terminal device 103 to send a request to the server 105. The server 105 may obtain, based on relevant information carried in the request, three-dimensional coordinates of the plurality of feature points of the model surface in a world coordinate system, and pixel coordinates of the plurality of feature points of the model surface on the first frame of image; determine, according to the three-dimensional coordinates of the plurality of feature points of the model surface in the world coordinate system and the pixel coordinates of the plurality of feature points of the model surface on the first frame of image, a pose of a camera coordinate system of the first frame of image relative to the world coordinate system; determine, according to the target plane, the three-dimensional coordinates of the plurality of feature points of the model surface in the world coordinate system, and the pixel coordinates of the plurality of feature points of the model surface on the first frame of image, poses of camera coordinate systems of a second frame of image to an $m^{th}$ frame of image of the to-be-processed video relative to the world coordinate system; and replace the target three-dimensional model with a target model and place the target model on the world coordinate system to generate, according to the pose of the camera coordinate system of each frame of image of the to-be-processed video relative to the world coordinate system, a target video including the target model. The server 105 may return the target video to the terminal device 103, so that the user may watch the displayed target video that includes the target model on the terminal device 103. In some embodiments, the target model may be a displaylink model.

In another example, the terminal device 103 (which may alternatively be the terminal device 101 or 102) may be a smart television, a VR/AR helmet display, or a mobile terminal on which an instant messaging or video application (APP) are installed, for example, a smartphone or a tablet computer. The user may send various requests to the server 105 through the terminal device 103. The server 105 may obtain, based on the request, feedback information in response to the request and return the feedback information to the terminal device 103 for displaying.

Figure 2:
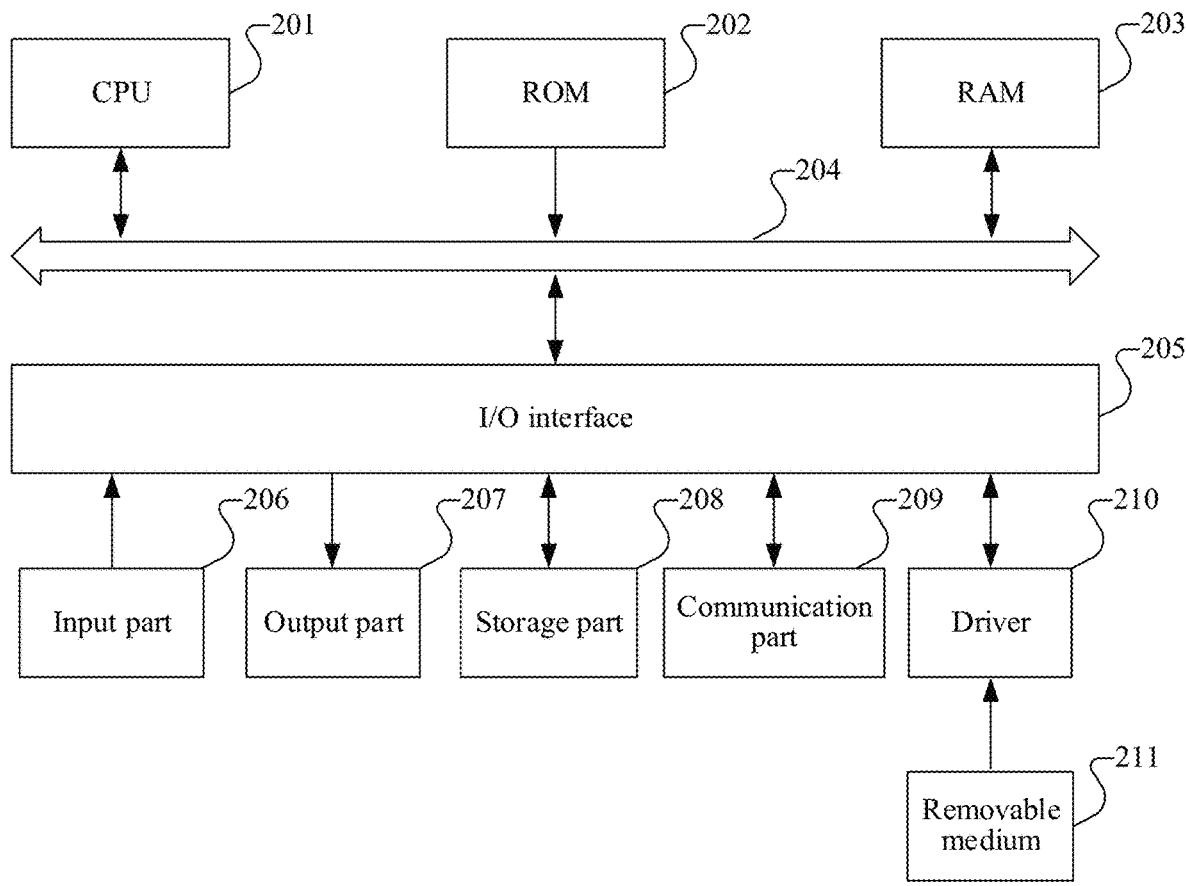
FIG. 2 is a schematic structural diagram of a computer system suitable for implementing an electronic device according to an embodiment of the present disclosure.

FIG. 2 is a schematic structural diagram of a computer system suitable for implementing an electronic device according to an embodiment of the present disclosure.

A computer system 200 for an electronic device shown in FIG. 2 is merely an example, and does not constitute any limitation on functions and scopes of use of the embodiments of the present disclosure.

As shown in FIG. 2, the computer system 200 includes a central processing unit (CPU) 201, which may perform various actions and processing based on a program stored in a read-only memory (ROM) 202 or a program loaded from a storage part 208 into a random access memory (RAM) 203. The RAM 203 further stores various programs and data necessary for system operations. The CPU 201, the ROM 202, and the RAM 203 are connected to each other by using a bus 204. An input/output (I/O) interface 205 is also connected to the bus 204.

The following components are connected to the I/O interface 205: an input part 206 including a keyboard, a mouse, or the like, an output part 207 including a cathode ray tube (CRT), a liquid crystal display (LCD), a speaker, or the like, the storage part 208 including a hard disk or the like, and a communication part 209 including a network interface card such as a local area network (LAN) card or a modem. The communication part 209 performs communication processing via a network such as the Internet. A driver 210 is also connected to the I/O interface 205 as required. A removable medium 211, such as a magnetic disk, an optical disc, a magneto-optical disk, or a semiconductor memory, is installed on the driver 210 as required, so that a computer program read therefrom is installed into the storage part 208 as required.

Particularly, according to the embodiments of the present disclosure, the processes described in the following with reference to the flowcharts may be implemented as computer software programs. For example, the embodiments of the present disclosure include a computer program product, including a computer program carried on a computer-readable storage medium. The computer program includes program code for performing the methods shown in the flowcharts. In such an embodiment, the computer program may be downloaded from a network via the communication part 209 and installed, or installed from the removable medium 211. When the computer program is executed by the CPU 201, various functions described in the method and/or apparatus of this disclosure are executed.

The computer-readable storage medium shown in the present disclosure may be a computer-readable signal medium, a computer-readable storage medium, or any combination thereof. The computer-readable storage medium may include, but is not limited to, for example, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a RAM, a ROM, an erasable programmable read-only memory (EPROM or a flash memory), an optical fiber, a portable compact disc read-only memory (CD-ROM), an optical storage device, a magnetic storage device, or any suitable combination thereof. In the present disclosure, the computer-readable storage medium may be any tangible medium including or storing a program, and the program may be used by or in combination with an instruction execution system, apparatus, or device. In the present disclosure, the computer-readable signal medium may be a data signal included in a baseband or propagated as a part of a carrier, in which computer-readable program code is carried. The propagated data signal may be in a plurality of forms, including but not limited to, an electromagnetic signal, an optical signal, or any suitable combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The program code included in the computer-readable storage medium may be transmitted by using any appropriate medium, including but not limited to: a wireless medium, a wire, an optical cable, radio frequency (RF), or the like, or any suitable combination thereof.

The flowcharts and block diagrams in the accompanying drawings show architectures, functions, and operations that may be implemented for the method, the apparatus, and the computer program product according to the embodiments of the present disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related modules and/or units and/or subunits described in the embodiments of the present disclosure may be implemented in software, or hardware, or the combination thereof. The described modules and/or units and/or subunits may alternatively be set in a processor. Names of the modules and/or units and/or subunits do not constitute a limitation on the modules and/or units and/or subunits in a specific case.

According to another aspect, this application further provides a non-transitory computer-readable storage medium. The non-transitory computer-readable storage medium may be included in the electronic device described in the foregoing embodiments, or may exist alone and is not disposed in the electronic device. The non-transitory computer-readable storage medium carries one or more programs, the one or more programs, when executed by the electronic device, causing the electronic device to implement the method described in the following embodiments. For example, the electronic device may implement steps shown in FIG. 3, FIG. 4, FIG. 5, FIG. 6, FIG. 7, FIG. 8, FIG. 9, or FIG. 10.

In some implementations, a method of placing a three-dimensional advertisement into a video is generally performing three-dimensional reconstruction on an entire scene in each frame of image of a video based on a three-dimensional reconstruction algorithm such as simultaneous localization and mapping (SLAM) or structure from motion (SFM), to obtain a three-dimensional space, and calculating a position and an orientation of a camera of each frame of image. Then a three-dimensional advertisement model is added to the three-dimensional space and projected onto each frame of image, to implement placement of a three-dimensional advertisement.

Figure 3:
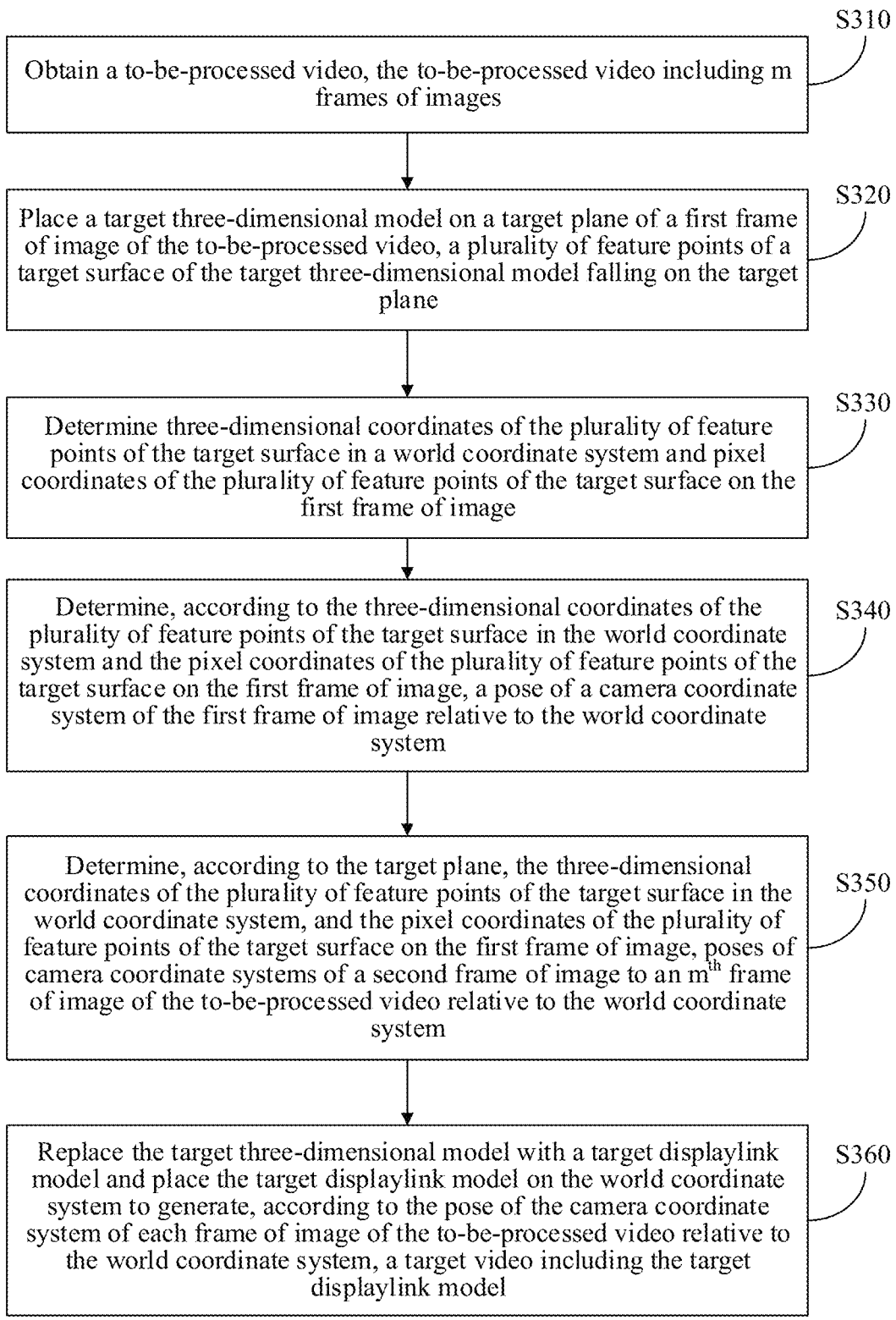
FIG. 3 is a flowchart of an image processing method according to an embodiment of the present disclosure.

FIG. 3 is a flowchart of an image processing method according to an embodiment of the present disclosure. The method may be executed by any electronic device having computing and processing capabilities, for example, one or more of the terminal devices 101, 102, and 103 and/or the server 105 shown in FIG. 1.

As shown in FIG. 3, the image processing method provided in this embodiment of the present disclosure may include the following steps.

Step S310. Obtain a to-be-processed video, the to-be-processed video including m frames of images, m being a positive integer greater than or equal to 2.

In this embodiment of the present disclosure, the to-be-processed video may be, for example, a video in which an advertisement is currently to be placed. The to-be-processed video may be deframed to extract the m frames of images that are included in the video and in which the advertisement is to be placed, but herein, the to-be-processed video is not limited to including only the m frames of images.

Step S320. Place a target three-dimensional model on a target plane of a first frame of image of the to-be-processed video, a plurality of feature points of a model surface of the target three-dimensional model falling on the target plane.

In this embodiment of the present disclosure, the first frame of image may refer to a start frame of image among the extracted m frames of images sorted by time, and may be numbered 0 or 1 (using the number being 1 as an example below). However, the present disclosure is not limited thereto. In other embodiments, any one of the extracted m frames of images may alternatively be used as the first frame of image.

In this embodiment of the present disclosure, the target plane of the first frame of image refers to a plane on which a user expects to place the advertisement, for example, any one of a desktop, a stool surface, a plano surface, a book table top, or a floor in the first frame of image.

In this embodiment of the present disclosure, the target three-dimensional model may be any one of a cube, a cuboid, a Rubik's cube, a quadrangular pyramid, a sphere, a cylinder, or the like, which is not limited in the present disclosure. Alternatively, a three-dimensional model of an advertisement to be placed, for example, a red cola can mentioned in the following embodiments, may be directly put in the first frame of image as the target three-dimensional model. In the following example descriptions, an example in which the target three-dimensional model is a cube is used for description. For example, if the advertisement to be placed is a red cola can, a cube with a side length of 0.1 meter may be used as the target three-dimensional model. However the present disclosure is not limited thereto, provided that the size of the placed target three-dimensional model is approximately adapted to the size of the advertisement to be placed. When the shape and size of the advertisement that the user expects to place change, the shape and size of the placed target three-dimensional model may be adjusted adaptively. The cube is used as the target three-dimensional model because the shape of the cube can intuitively show whether a pose is correct, making it more convenient to adjust a position and a posture.

Using a cube as an example, it may be determined that a model surface of the cube is a bottom surface (a plane formed by an x axis and a y axis in a world coordinate system) of the cube, and four vertices of the bottom surface of the cube may be used as four feature points. A position and orientation posture (a pose for short) of the cube on the first frame of image are adjusted, so that the four vertices of the bottom surface of the cube fall on the target plane.

In other embodiments, it is not limited to using the bottom surface of the cube as a model surface. Any surface of the cube may be used as a model surface. In addition, it is not limited to using the vertices of the model surface as feature points. Any points on the model surface that facilitate calibration may be used as feature points. Moreover, a quantity of the feature points is not limited to four in the foregoing example. For example, five feature points or six feature points may alternatively be used. If another three-dimensional model is used as the target three-dimensional model, the model surface is not limited to a shape having vertices, and may be a shape without vertices such as a circle/ellipse. For example, if a cylinder is used as the target three-dimensional model, a circle at a bottom surface of the cylinder is used as a model surface, and several feature points on the circle can be used for calibration. Even though the determined model surface is a pattern having vertices, the model surface is not limited to patterns such as a quadrilateral. For example, if the pattern is a triangle, the triangle has only three vertices, and the three vertices and another feature point may be used as a plurality of feature points of the model surface, provided that three-dimensional coordinates of the plurality of feature points taken in the world coordinate system of the target three-dimensional model can be determined. In another example, if the target three-dimensional model is a sphere, the center of the sphere may be used as an origin of coordinates. A cross-section intersecting the center is a model surface, and points on a circle where the cross-section and the sphere intersect are feature points.

Step S330. Determine three-dimensional coordinates of the plurality of feature points of the model surface in a world coordinate system and pixel coordinates of the plurality of feature points of the model surface on the first frame of image.

Step S340. Determine, according to the three-dimensional coordinates of the plurality of feature points of the model surface in the world coordinate system and the pixel coordinates of the plurality of feature points of the model surface on the first frame of image, a pose of a camera coordinate system of the first frame of image relative to the world coordinate system.

Step S350. Determine, according to the target plane, the three-dimensional coordinates of the plurality of feature points of the model surface in the world coordinate system, and the pixel coordinates of the plurality of feature points of the model surface on the first frame of image, poses of camera coordinate systems of a second frame of image to an $m^{th}$ frame of image of the to-be-processed video relative to the world coordinate system.

Step S360. Replace the target three-dimensional model with a target model and place the target model on the world coordinate system to generate, according to the pose of the camera coordinate system of each frame of image of the to-be-processed video relative to the world coordinate system, a target video including the target model.

In the present disclosure, shapes and structures of the selected target three-dimensional model and target model are not limited, and the target plane and the model surface are not limited to triangles or quadrilaterals, and may be any shape such as a circle or an ellipse.

In this embodiment of the present disclosure, the application scenario of placing an advertisement in a video is still used as an example, and the target model may be, for example, a three-dimensional advertisement model. A person skilled in the art can understand that solutions provided in this embodiment of the present disclosure may also be used for placing a two-dimensional advertisement, because the two-dimensional advertisement may be considered as an infinitely thin three-dimensional advertisement.

According to the image processing method provided in this embodiment of the present disclosure, on one hand, a target three-dimensional model is placed in a first frame of image of a to-be-processed video. The target three-dimensional model is placed on a target plane in the first frame of image, and a pose of the target three-dimensional model in the first frame of image relative to a camera coordinate system is calculated. By tracking the target plane, a pose of the target three-dimensional model in each following frame of image of the to-be-processed video relative to a camera coordinate system may be calculated, and then, by replacing the target three-dimensional model in the to-be-processed video with a target model, the target model may be automatically placed on each frame of image of the to-be-processed video. On the other hand, the target plane is tracked. Such a manner does not rely on the calculation on feature points of images in the to-be-processed video nor does it require a video with a large parallax, which results in a small calculation amount, a fast speed, convenient operation, and high accuracy, and may be applied to various kinds of videos, thereby improving the efficiency and effect of placing the target model in the video.

Figure 4:
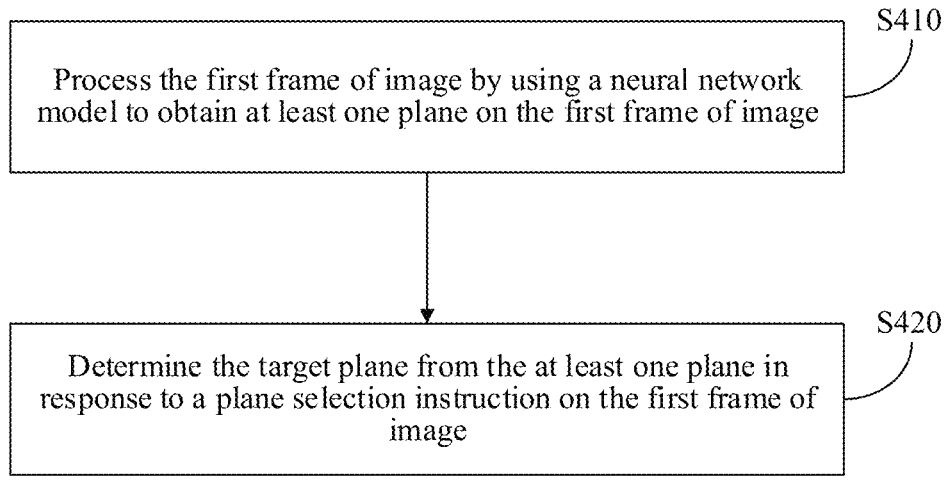
FIG. 4 is a flowchart of an image processing method according to another embodiment of the present disclosure.

FIG. 4 is a flowchart of an image processing method according to another embodiment of the present disclosure.

As shown in FIG. 4, a difference from the foregoing embodiment is that the image processing method provided in this embodiment of the present disclosure may further include the following steps.

Step S410. Process the first frame of image by using a neural network model to obtain at least one plane on the first frame of image.

In this embodiment of the present disclosure, the neural network model may be any deep learning model capable of performing instance segmentation, for example, mask region-convolutional neural network (Mask R-CNN).

In an exemplary embodiment, the method may further include: obtaining a training data set, the training data set including sample pictures and labeled plane positions and plane types of the sample pictures; and training the neural network model by using the training data set.

In this embodiment of the present disclosure, plane positions and the plane types, for example, a desktop, a wall, a plano plane, and a stool plane, may be pre-labeled on a batch of sample pictures. Then the batch of samples are used for training a neural network model. The first frame of image of the to-be-processed video in which the advertisement is to be placed is then sent to the trained neural network model for segmentation to obtain planes on the first frame of image.

Step S420. Determine the target plane from the at least one plane in response to a plane selection instruction on the first frame of image.

For example, if a target three-dimensional advertisement of a red cola can is to be placed on a plano plane on the first frame of image of the to-be-processed video, the plano plane on the first frame of image may be selected as the target plane.

In other embodiments, the user may further manually select a plane on the first frame of image as the target plane. For example, the user drags a mouse to make a mark on the plano plane of the first frame of image to select the plano plane as the target plane. The present disclosure does not limit the method for determining a target plane.

Figure 5:
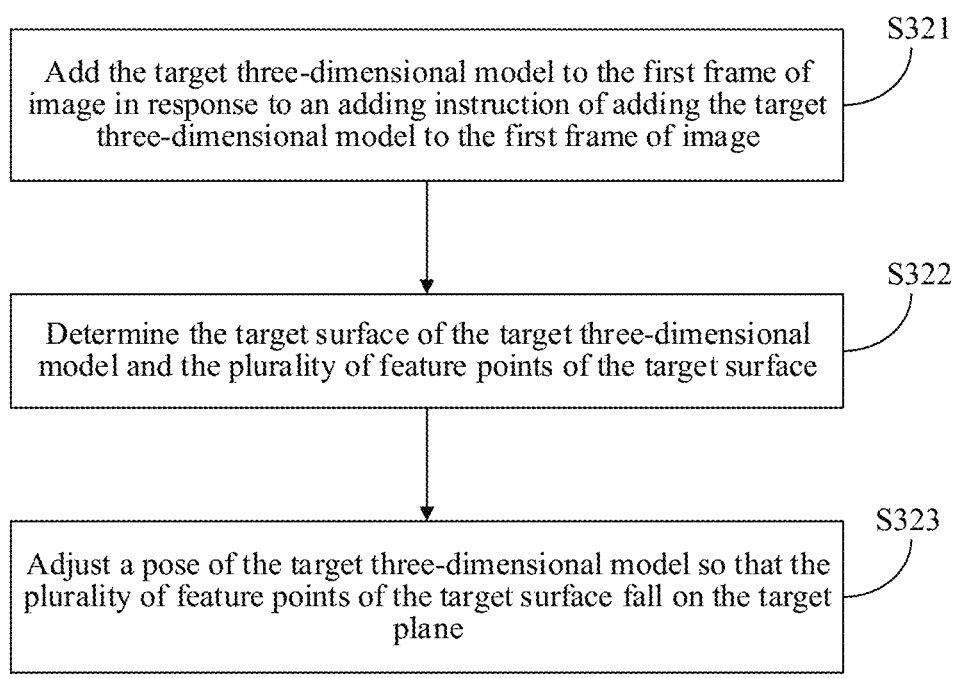
FIG. 5 is a schematic diagram of a processing process of step S320 shown in FIG. 3 in an embodiment.

FIG. 5 is a schematic diagram of a processing process of step S320 shown in FIG. 3 in an embodiment.

As shown in FIG. 5, in this embodiment of the present disclosure, step S320 may further include the following steps.

Step S321. Add the target three-dimensional model to the first frame of image in response to an adding instruction of adding the target three-dimensional model to the first frame of image.

For example, the user may hold the cube with a finger or a mouse and drag the cube into the first frame of image of the to-be-processed video, or add a selected or default target three-dimensional model into the first frame of image by a button having an adding function.

Step S322. Determine the model surface of the target three-dimensional model and the plurality of feature points of the model surface.

For example, the bottom surface of the cube may be used as the model surface of the cube, and four vertices of the bottom surface of the cube may be used as four feature points.

Step S323. Adjust a pose of the target three-dimensional model so that the plurality of feature points of the model surface fall on the target plane.

In an exemplary embodiment, the step of adjusting a pose of the target three-dimensional model so that the plurality of feature points of the model surface fall on the target plane may include: adjusting the plurality of feature points of the target three-dimensional model so that the plurality of feature points of the model surface fall on the target plane; or re-positioning the target three-dimensional model by rotating, sliding, tilting, or the like, so that the plurality of feature points of the model surface fall on the target plane.

For example, after the cube is dragged into the first frame of image of the to-be-processed video, in the first frame of image, the user may manually adjust the plurality of vertices of the cube or re-position the cube so that the four vertices of the bottom surface of the cube fall on the target plane of the first frame of image. In another example, AI technology may be used. The target plane in the first frame of image and the cube may be automatically recognized and the pose of the cube may be automatically adjusted by using AI so that the four vertices of the bottom surface of the cube fall on the target plane of the first frame of image. Then the target plane where the cube is located and four points (which may be the four vertices of the bottom surface of the cube, or may be any other four pixels of the bottom surface, where the four vertices are used as an example in the following descriptions) of the cube on the target plane may be recorded.

Figure 6:
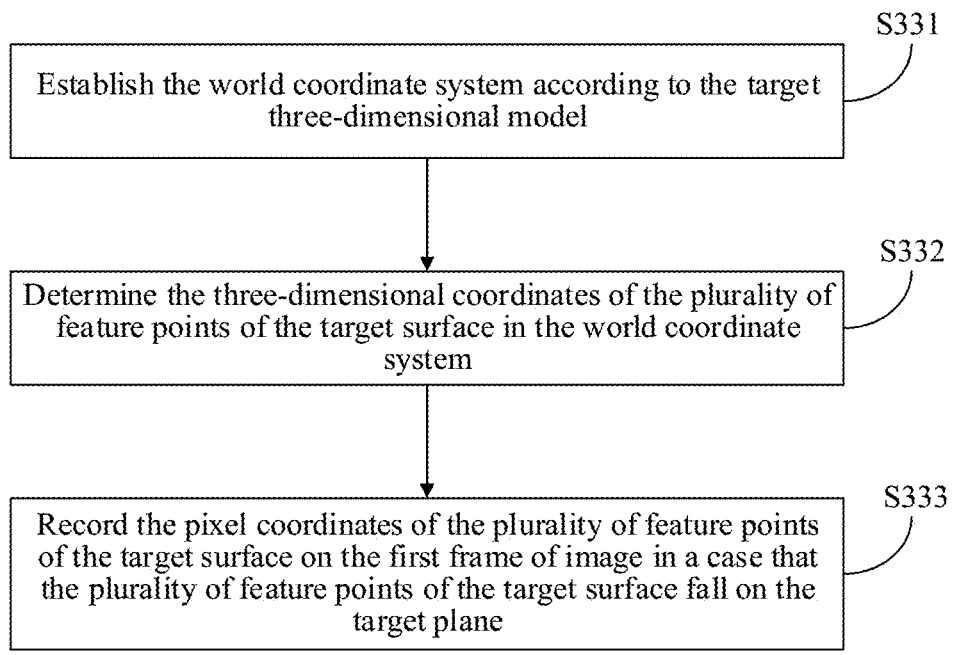
FIG. 6 is a schematic diagram of a processing process of step S330 shown in FIG. 3 in an embodiment.

FIG. 6 is a schematic diagram of a processing process of step S330 shown in FIG. 3 in an embodiment.

As shown in FIG. 6, in this embodiment of the present disclosure, step S330 may further include the following steps.

Step S331. Establish the world coordinate system according to the target three-dimensional model.

Step S332. Determine the three-dimensional coordinates of the plurality of feature points of the model surface in the world coordinate system.

Step S333. Record the pixel coordinates of the plurality of feature points of the model surface on the first frame of image in a case that the plurality of feature points of the model surface fall on the target plane.

For example, if the bottom surface of the cube is the model surface, pixel coordinates of the four vertices a, b, c, d (reference may be made to FIG. 11) of the bottom surface on the first frame of image may be denoted as $p_{a,1}$, $p_{b,1}$, $p_{c,1}$, and $p_{d,1}$.

Figure 7:
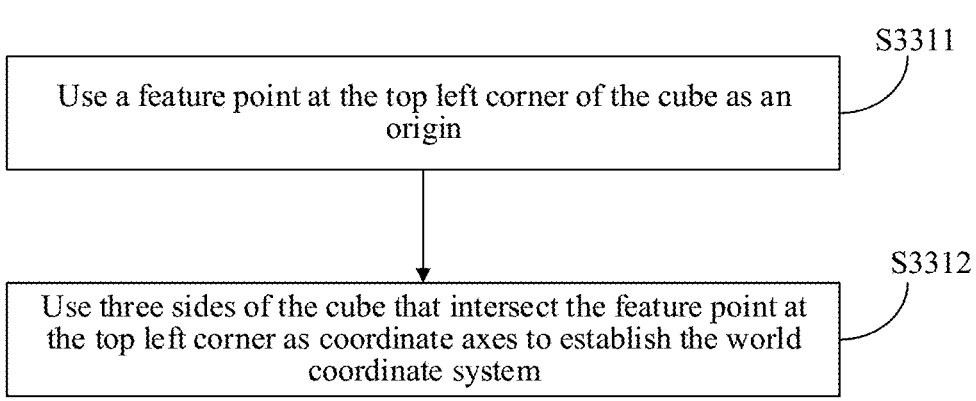
FIG. 7 is a schematic diagram of a processing process of step S331 shown in FIG. 6 in an embodiment.

FIG. 7 is a schematic diagram of a processing process of step S331 shown in FIG. 6 in an embodiment.

As shown in FIG. 7, in this embodiment of the present disclosure, step S331 may further include the following steps.

Step S3311. Use a feature point at the top left corner of the cube as an origin.

Step S3312. Use three sides of the cube that intersect the feature point at the top left corner as coordinate axes to establish the world coordinate system.

The three-dimensional coordinates of the four vertices a, b, c, d of the bottom surface of the cube in the world coordinate system are denoted as $P_a$, $P_b$, $P_c$, and $P_d$.

If another three-dimensional model is used as the target three-dimensional model, for example, a quadrangular pyramid, a vertex at the bottom left corner of the bottom surface of the quadrangular pyramid may be used as an origin, the origin to a right vertex may be used as an x axis, the origin to a vertex at the upper left corner may be used a y axis, and a direction perpendicular to the bottom surface may be used as a z axis, so as to establish a rectangular coordinate system as the world coordinate system of the quadrangular pyramid.

Figure 8:
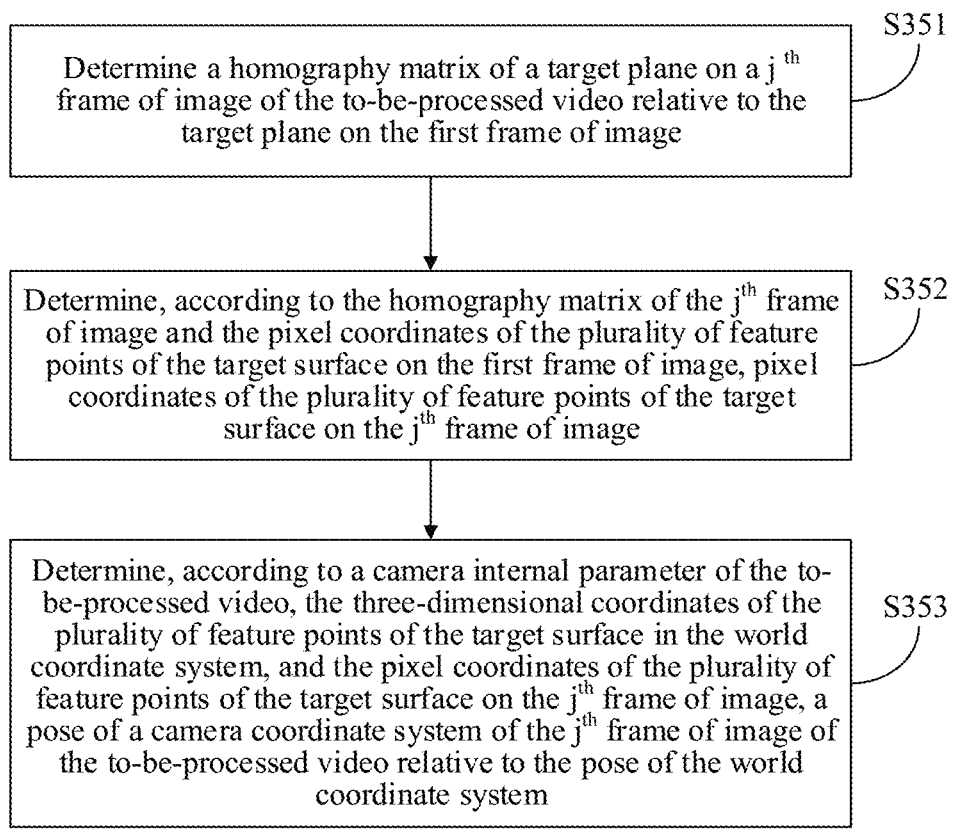
FIG. 8 is a schematic diagram of a processing process of step S350 shown in FIG. 3 in an embodiment.

FIG. 8 is a schematic diagram of a processing process of step S350 shown in FIG. 3 in an embodiment.

As shown in FIG. 8, in this embodiment of the present disclosure, step S350 may further include the following steps.

Step S351. Determine a homography matrix of a target plane on a $j^{th}$ frame of image of the to-be-processed video relative to the target plane on the first frame of image as a homography matrix of the $j^{th}$ frame of image, j being a positive integer greater than or equal to 2 and less than or equal to m.

Homography is a concept in projective geometry, and is also referred to as projective transformation. The homography maps a point (three-dimensional homogeneous vector) on a projective plane to another projective plane, and maps a straight line as a straight line, which has line-preserving properties. In general, the homography is a linear transformation of the three-dimensional homogeneous vector, which may be represented by a 3×3 non-singular matrix H.

In this embodiment of the present disclosure, the application scenario of placing an advertisement in a video is used as an example. A target plane B in a to-be-processed video is tracked, and an area and deformation of the target plane B in each frame of image are calculated, that is, a homography matrix of the target plane B in a current frame of image relative to the target plane B in another frame of image (i.e., the reference frame of image) is calculated. On each following frame of image, the plane tracking method is used to track the target plane B and calculate the homography matrix.

In the description below, first, second, and third frames of images of the to-be-processed video are used as an example.

First, in the first frame of image of the to-be-processed video, the target plane B on which an advertisement is to be placed is selected, and all pixel coordinates $A_1$ on the target plane B are determined. It is assumed that $A_1 = \{p_1^{\,1}(u_1^{\,1}, v_1^{\,1}), p_1^{\,2}(u_1^{\,2}, v_1^{\,2}), p_1^{\,3}(u_1^{\,3}, v_1^{\,3}) \ldots p_1^{\,n}(u_1^{\,n}, v_1^{\,n})\}$, $p_1^{\,i}(u_1^{\,i}, v_1^{\,i})$ representing an $i^{th}$ pixel of the target plane B in $A_1$, and it is assumed that there are n pixels in total, n being a positive integer greater than 1, and i being a positive integer greater than or equal to 1 and less than n.

It is assumed that an initial value of a homography matrix $H_2$ of the second frame of image of the to-be-processed video is a unit matrix $$\begin{bmatrix} 1 & 0 & 0 \\ 0 & 1 & 0 \\ 0 & 0 & 1 \end{bmatrix}.$$

Then, $A_1$ is mapped onto the second frame of image by using $H_2$ to obtain all pixel coordinates $A_2$ on the target plane B, $A_2 = \{p_2^{\,1}(u_2^{\,1}, v_2^{\,1}), p_2^{\,2}(u_2^{\,2}, v_2^{\,2}), p_2^{\,3}(u_2^{\,3}, v_2^{\,3}) \ldots p_2^{\,n}(u_2^{\,n}, v_2^{\,n})\}$. (For example, pixel coordinates of a first pixel in $A_1$ are $p_1^{\,1}(u_1^{\,1}, v_1^{\,1})$, pixel coordinates of the first pixel mapped onto $A_2$ are $p_2^{\,1}(u_2^{\,1}, v_2^{\,1})$, and a calculation expression is as follows:

$$p_2^1(u_2^1, v_2^1) = H_2 \square p_1^1(u_1^1, v_1^1) \tag{1}$$

where $$H_2 = \begin{bmatrix} h_1 & h_2 & h_3 \\ h_4 & h_5 & h_6 \\ h_7 & h_8 & 1 \end{bmatrix} \tag{2}$$

-continued $$\begin{cases} u_2^1 = \dfrac{h_1 u_1^1 + h_2 v_1^1 + h_3}{h_7 u_1^1 + h_8 v_1^1 + 1} \\ v_2^1 = \dfrac{h_4 u_1^1 + h_5 v_1^1 + h_6}{h_7 u_1^1 + h_8 v_1^1 + 1} \end{cases} \quad (3)$$

Then, a residual between a pixel value of each pixel of $A_1$ and a corresponding pixel value of each pixel of $A_2$ is calculated to calculate a correlation f. The correlation f is used for evaluating the similarity between $A_1$ and $A_2$, which may be calculated by using a method such as the sum of squared differences (SSD) method or the Pearson correlation method. The homography matrix $H_2$ is optimized according to the correlation f (denoted as $H_{2,0}$). For example, an adjustment $\Delta H$ may be performed on $H_2$, so as to maximize the value of the correlation f, and an optimization expression is as follows:

$$\Delta \hat{H} = \arg\max_{\Delta H}(f(A_1, A_2)) = \quad (4)$$
$$\arg\max_{\Delta H}(f(I_1(p_1^1, p_1^2 \ldots p_1^n), I_2((H_2 + \Delta H)\square(p_2^1, p_2^2 \ldots p_2^n))))$$

In the foregoing formula, $I_1$ and $I_2$ respectively represent the first frame of image and the second frame of image of the to-be-processed video. For specific calculation of the optimization $\Delta \hat{H}$, any one of a stochastic gradient descent method, a Gauss-Newton method, and a Newton method may be used. $\Delta \hat{H}$ represents the optimal $\Delta H$. Because an initial value of $\Delta H$ is a zero matrix, the value becomes the optimal value $\Delta \hat{H}$ only after optimization is performed by using the Gauss-Newton method or the like, as described above.

$H_{2,0}$ is obtained after the optimization. The update is shown in the following expression:

$$H_{2,0} = H_2 + \Delta \hat{H} = \begin{bmatrix} h_1 + \Delta h_1 & h_2 + \Delta h_2 & h_3 + \Delta h_3 \\ h_4 + \Delta h_4 & h_5 + \Delta h_5 & h_6 + \Delta h_6 \\ h_7 + \Delta h_7 & h_8 + \Delta h_8 & 1 \end{bmatrix} \quad (5)$$

The optimized $H_{2,0}$ is then used as a hypothetical initial value of a homography matrix $H_3$ of the third frame of image of the to-be-processed video. $A_1$ is mapped onto the third frame of image by using $H_3$, to obtain an optimized $H_{3,0}$. The optimized $H_{3,0}$ is then used as a hypothetical initial value of a homography matrix $H_4$ of the fourth frame of image of the to-be-processed video . . . . The step is repeated until the $m^{th}$ frame of image.

In this embodiment of the present disclosure, when the target plane B in a frame of image is blocked by foreground, for example, a person or a car, a pixel residual of a blocked part is not calculated. A manual selection method or some deep learning methods may be used to identify which areas are blocked. That is, all pixels involved in calculation of the correlation f in $A_1$, $A_2$, $A_2$ . . . $A_m$ are non-blocked pixels.

The solutions provided in this embodiment of the present disclosure do not rely on extraction of feature points, and can still work in a case that a target plane has small brightness changes and the texture is insufficient. Moreover, information of the entire target plane can be fully used. According to the plane tracking method provided in this embodiment of the present disclosure, an optimized homography matrix of a previous frame is used as an initial value of a homography matrix of a next frame, to optimize the homography matrix of the next frame, so that the calculation speed is faster, and the target plane in the to-be-processed video may be effectively tracked. Moreover, in a case that the target plane is blocked, the tracking is not limited by an observation angle of the target plane, and when an observation angle of the following image frame changes greatly relative to the first frame, the target plane can still be effectively tracked.

In other embodiments, a feature point method may alternatively be used to track the target plane. By matching feature points of different frames of images, homography matrices between the different frames of images may be calculated.

Step S352. Determine, according to the homography matrix of the $j^{th}$ frame of image and the pixel coordinates of the plurality of feature points of the model surface on the first frame of image, pixel coordinates of the plurality of feature points of the model surface on the $j^{th}$ frame of image.

Still using an example in which the bottom surface of the cube is the model surface, the plane tracking method is first used to calculate a homography matrix $H_{j,0}$ of the target plane B on the $j^{th}$ frame of image relative to the target plane on the first frame of image. Then, based on the homography matrix $H_{j,0}$, pixel coordinates of the four vertices of the bottom surface of the cube on the $j^{th}$ frame of image denoted as: $p_{a,j}$, $p_{b,j}$, $p_{c,j}$ and $P_{d,j}$ may be calculated as follows:

$$p_{a,j} = H_{j,0} * p_{a,1} \quad (6)$$

$$p_{b,j} = H_{j,0} * p_{b,1} \quad (7)$$

$$p_{c,j} = H_{j,0} * p_{c,1} \quad (8)$$

$$p_{d,j} = H_{j,0} * p_{d,1} \quad (9)$$

The present disclosure is not limited to using the plane tracking method to calculate a homography matrix, and then calculate pixel coordinates of the four vertices of the bottom surface of the cube on a current frame of image according to the homography matrix. In other embodiments, a feature point matching method may be used to directly track and match pixel coordinates of the four vertices on each frame of image.

Step S353. Determine, according to a camera intrinsic parameter of the to-be-processed video, the three-dimensional coordinates of the plurality of feature points of the model surface in the world coordinate system, and the pixel coordinates of the plurality of feature points of the model surface on the $j^{th}$ frame of image, a pose of a camera coordinate system of the $j^{th}$ frame of image of the to-be-processed video relative to the world coordinate system.

It is assumed that a camera intrinsic parameter K is known. If the camera intrinsic parameter K is unknown, images of the to-be-processed video may be sent to a deep learning model to obtain the camera intrinsic parameter K through learning. The deep learning model herein may be any deep learning model that can implement "single image camera calibration", for example, a perceptual measure for deep single image camera calibration.

In this embodiment of the present disclosure, for each frame of image following the first frame of image, the homography matrix of the target plane B relative to the first frame of image is calculated. According to the homography matrix, the pixel coordinates of the four feature points of the bottom surface of the cube on the $j^{th}$ frame of image are calculated as: $p_{a,j}$, $p_{b,j}$, $p_{c,j}$, and $p_{d,j}$. Then, according to the pixel coordinates $p_{a,j}$, $p_{b,j}$, $p_{c,j}$, and $p_{d,j}$ of the four feature points, the three-dimensional coordinates $P_a$, $P_b$, $P_c$, and $P_d$ of the four feature points of the bottom surface of the cube, and the camera intrinsic parameter K, a position and an orientation the cube on the $j^{th}$ frame of image may be calculated.

For example, the three-dimensional coordinates $P_a$, $P_b$, $P_c$, and $P_d$ of the four vertices of the bottom surface of the cube, the pixel coordinates $p_{a,j}$, $p_{b,j}$, $p_{c,j}$, and $p_{d,j}$ of the four vertices on the $j^{th}$ frame of image, and the camera intrinsic parameter K may be inputted into a perspective-n-point (PnP) algorithm to calculate a position $t_j$ and an orientation $R_j$ of the camera coordinate system of the $j^{th}$ frame of image relative to the world coordinate system O. Then, the cube may be projected onto the current frame of image for display.

By inputting the three-dimensional coordinates of the plurality of feature points of the model surface of the target three-dimensional model in the world coordinate system and the pixel coordinates of these feature points on the current frame of image, a position t and an orientation R of a camera coordinate system of the current frame of image relative to the world coordinate system can be calculated. The present disclosure is not limited to using the PnP method to calculate the pose of the cube. Any other method may be used, provided that the same function can be implemented.

Figure 9:
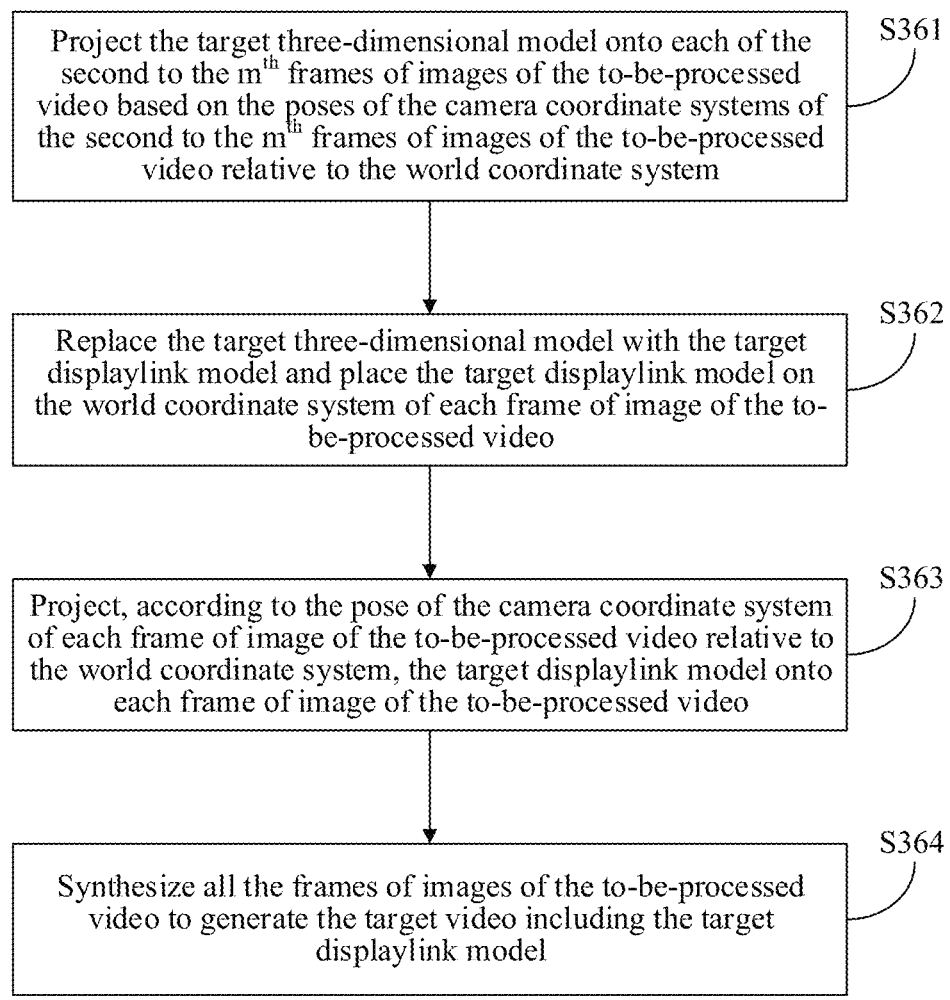
FIG. 9 is a schematic diagram of a processing process of step S360 shown in FIG. 3 in an embodiment.

FIG. 9 is a schematic diagram of a processing process of step S360 shown in FIG. 3 in an embodiment.

As shown in FIG. 9, in this embodiment of the present disclosure, step S360 may further include the following steps.

Step S361. Place the target three-dimensional model onto each of the second frame of image to the $m^{th}$ frame of image of the to-be-processed video based on the poses of the camera coordinate systems of the second frame of image to the $m^{th}$ frame of image of the to-be-processed video relative to the world coordinate system.

For example, the cube may be placed onto a picture of the current frame of image based on the position and the orientation of the camera coordinate system in the current frame of image relative to the world coordinate system.

In some implementations, placing the target three-dimensional model may be in the form of a projection.

Step S362. Replace the target three-dimensional model with the target model and place the target model on the world coordinate system of each frame of image of the to-be-processed video.

Step S363. Project, according to the pose of the camera coordinate system of each frame of image of the to-be-processed video relative to the world coordinate system, the target model onto each frame of image of the to-be-processed video.

Step S364. Synthesize all the frames of images of the to-be-processed video to generate the target video including the target model.

For example, a target three-dimensional advertisement model is used to replace the cube on each frame of image of the to-be-processed video. The target three-dimensional advertisement model is projected onto each frame of image, and all the frames of images are synthesized with the target three-dimensional advertisement model to generate the target video.

Specifically, according to the previous steps, positions and orientations of camera coordinate systems of all the frames of images of the to-be-processed video relative to the world coordinate system are calculated, the target three-dimensional advertisement model is placed on the world coordinate system, and the target three-dimensional advertisement model is projected onto each frame of image according to the pose of each frame of image for synthesis to obtain the target video including the target three-dimensional advertisement model.

For example, a vertex on the bottom surface of the cube is used as an origin to establish a three-dimensional rectangular coordinate system as the world coordinate system. A three-dimensional model of a red cola can has its own reference coordinate system. The reference coordinate system of the red cola can may be defined as the three-dimensional rectangular coordinate system of the cube. In other words, the relative position between the red cola can and the camera coordinate system is fixed. A position and an orientation of the red cola can relative to a camera coordinate system may be calculated for replacement when the position and the orientation of the red cola can relative to the cube are obtained. The calculation process is as follows:

$$T_{cam\_cola} = T_{cam\_cube} * T_{cube\_cola} \qquad (10)$$

In the foregoing formula, $T_{cam\_cola}$ represents the pose of the red cola can relative to the camera coordinate system, $T_{cam\_cube}$ represents the pose of the cube relative to the camera coordinate system, and $T_{cube\_cola}$ represents the pose of the red cola can relative to the cube. It may be alternatively understood that the red cola can is initially placed inside the cube, and a bottom surface of the red cola can overlaps the bottom surface of the cube. Therefore, the position and the orientation of the target three-dimensional advertisement model in each frame of image relative to the camera coordinate system may be determined based on the position and the orientation of the cube relative to the camera coordinate system. Finally, the cube is removed and the red cola can is displayed.

Figure 10:
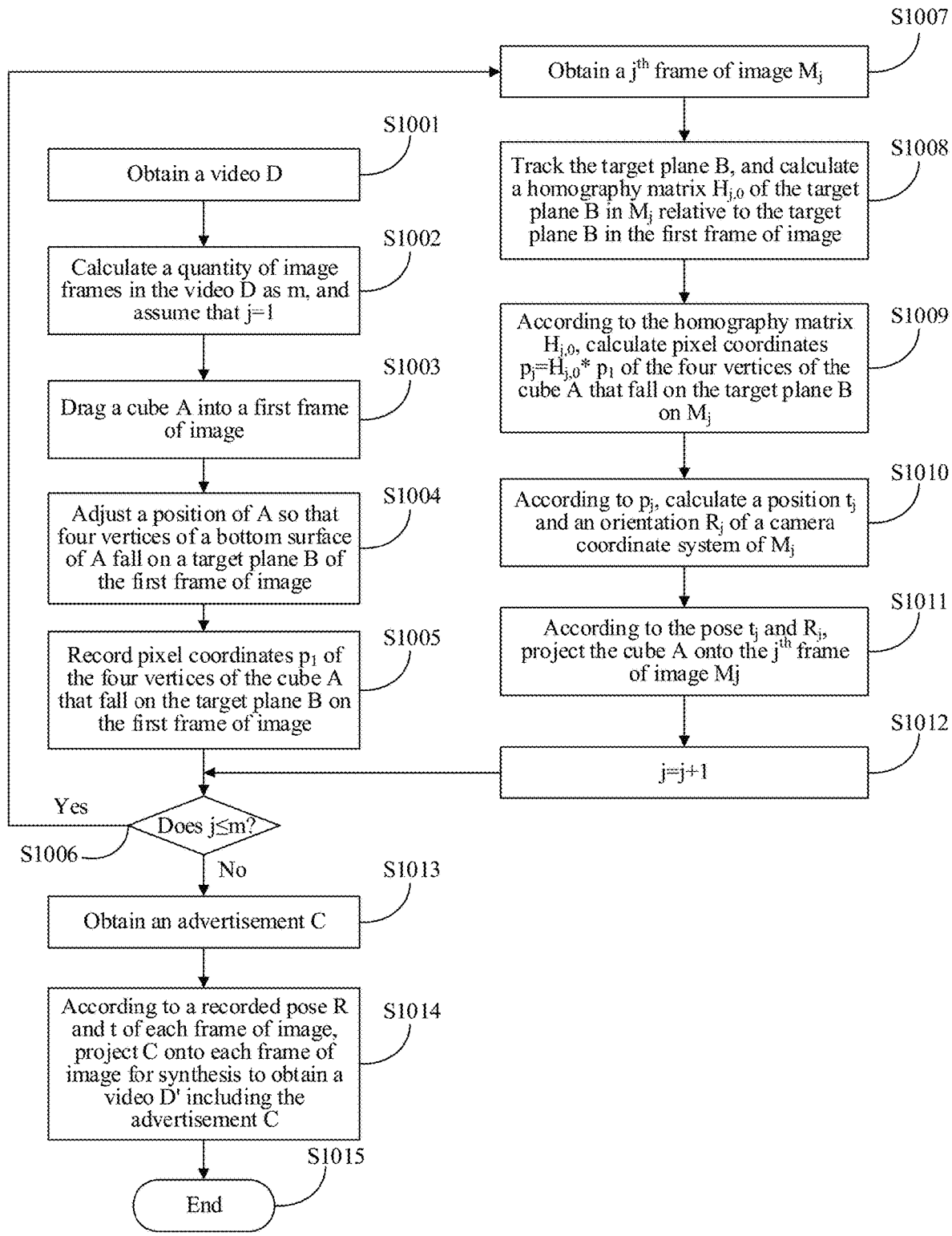
FIG. 10 is a flowchart of an image processing method according to still another embodiment of the present disclosure.

FIG. 10 is a flowchart of an image processing method according to still another embodiment of the present disclosure.

As shown in FIG. 10, the image processing method provided in this embodiment of the present disclosure may include the following steps.

Step S1001. Obtain a video D.

Step S1002. Calculate a quantity of image frames in the video D as m, and let j=1.

Step S1003. Drag a cube A into a first frame of image of the video D.

Step S1004. Adjust a position and an orientation of the cube A so that four vertices of a bottom surface of the cube A fall on a target plane B of the first frame of image.

Step S1005. Record pixel coordinates $p_1$ of the four vertices of the bottom surface of the cube A that fall on the target plane B on the first frame of image. Notice the index of p corresponds to the index of the frame of image.

Step S1006. Determine whether j≤m. If yes, perform step S1007. If no, perform step S1013.

Step S1007. Obtain a $j^{th}$ frame of image $M_j$ of the video D.

Step S1008. Track the target plane B, and calculate a homography matrix $H_{j,0}$ of the target plane B in the $j^{th}$ frame of image $M_j$ relative to the target plane B in the first frame of image.

Step S1009. According to the homography matrix $H_{j,0}$, calculate pixel coordinates $p_j = H_{j,0} * p_1$ of the four vertices of the cube A that fall on the target plane B on the $j^{th}$ frame of image $M_j$.

Step S1010. According to $p_j$, calculate a position $t_j$ and an orientation $R_j$ of a camera coordinate system of the $j^{th}$ frame of image $M_j$.

Step S1011. According to the pose (position and orientation) $t_j$ and $R_j$, project the cube A onto the $j^{th}$ frame of image $M_j$.

Step S1012. Let j=j+1, and jump back to step S1006.

Step S1013. Obtain an advertisement C.

Step S1014. According to a recorded pose R and t of each frame of image, project the advertisement C onto each frame of image for synthesis to obtain a video D' including the advertisement C.

Step S1015. End.

In this embodiment of the present disclosure, relevant original data and/or processed data may be stored in a blockchain. For example, original video data in which a three-dimensional advertisement has not been placed may be stored in the blockchain, and a to-be-processed video may be extracted from the original video data stored in the blockchain. Advertisements may also be stored in the blockchain. When an advertisement needs to be placed in the to-be-processed video, a corresponding target three-dimensional advertisement is extracted from the blockchain. The foregoing image processing method may be performed by any node in the blockchain (which may be a server and/or a user terminal device). After the image processing method is performed on the extracted to-be-processed video and three-dimensional advertisement, a target video including the three-dimensional advertisement may be obtained.

An example in which a cube is used as a target three-dimensional model, a model surface is a bottom surface of the cube, and a target plane is a plano plane in a to-be-processed video is used for description below. The solutions of this embodiment of the present disclosure may include: dragging the cube into a first frame of image of the to-be-processed video; tracking the plano plane in the to-be-processed video; updating a pose of the cube; and performing synthesis to obtain a target video including a three-dimensional advertisement.

Figure 11:
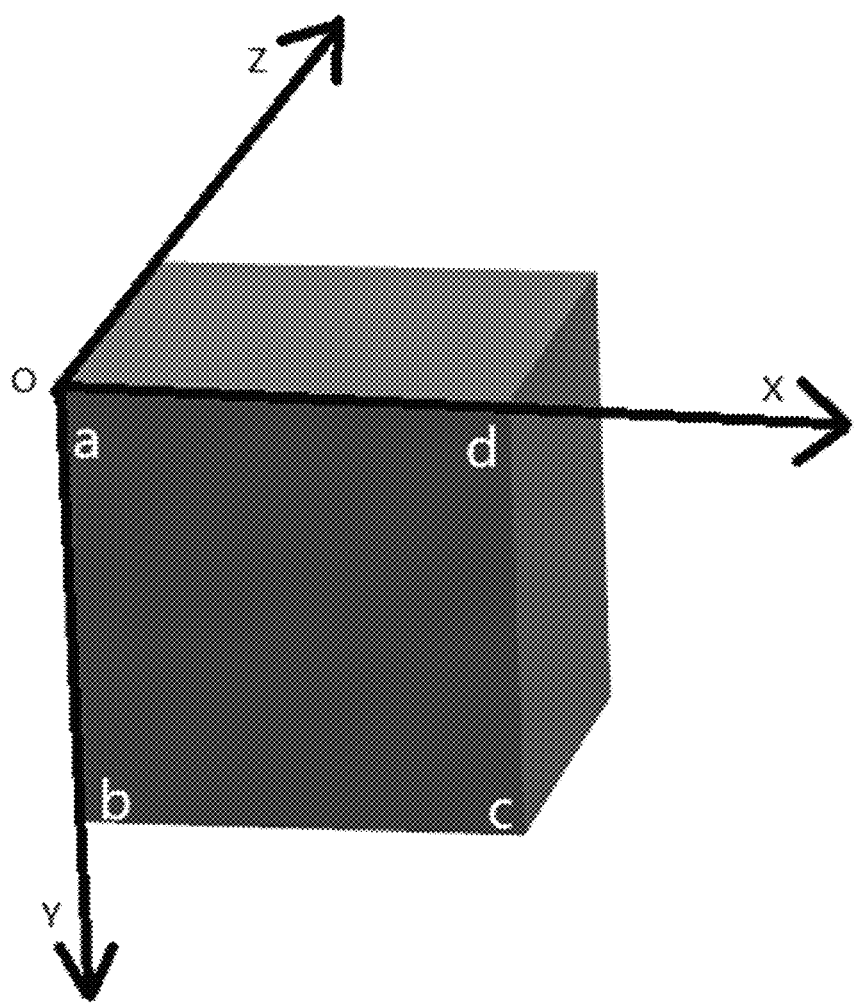
FIG. 11 is a schematic diagram of a cube and a world coordinate system of the cube according to an embodiment of the present disclosure.

FIG. 11 is a schematic diagram of a cube and a world coordinate system of the cube according to an embodiment of the present disclosure.

As shown in FIG. 11, assuming that a side length of the cube is set to 0.1 meter, a vertex at the top left corner of the cube is used as an origin, and three sides are used as coordinate axes, to establish a world coordinate system O. Then, three-dimensional coordinates P of four vertices on a bottom surface of the cube may be obtained. Three-dimensional coordinates of vertices a, b, c, and d are $P_a(0,0,0)$, $P_b(0,0.1,0)$, $P_c(0.1,0.1,0)$, and $P_d(0,1,0,0)$ respectively.

Figure 12:
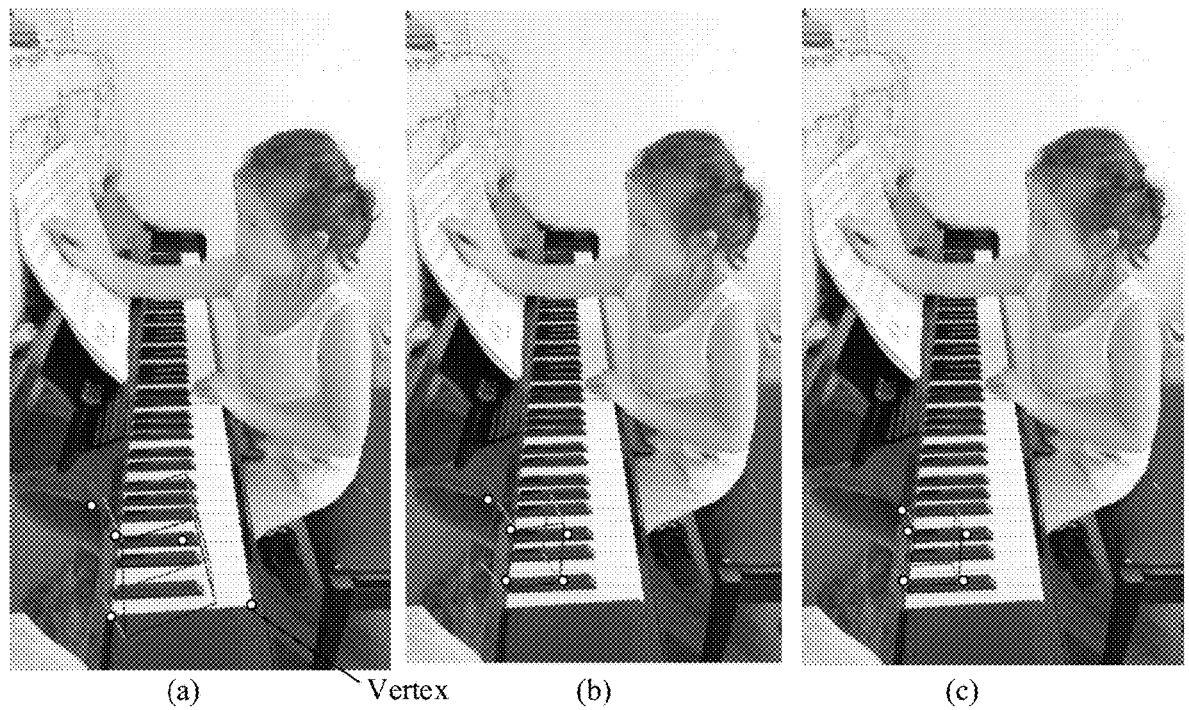
FIG. 12 is a schematic diagram of dragging vertices of a cube to control a pose of the cube according to an embodiment of the present disclosure.

FIG. 12 is a schematic diagram of dragging vertices of a cube to control a pose of the cube according to an embodiment of the present disclosure.

As shown in FIG. 12, a cube is dragged into a first frame of image of a to-be-processed video, and then vertices of the cube are dragged on the first frame of image to adjust a position and an orientation of the cube. FIG. 12(a) shows an initial position of white dots when the cube is dragged into the first frame of image at the beginning. FIG. 12(b) shows that the white dots are dragged and adjusted to positions that a user expects, for example, pixel positions where the user expects the four vertices of the bottom surface and one vertex of a top surface of the cube to appear. FIG. 12(c) shows that a pose of the cube is automatically adjusted according to the positions of the white dots adjusted in FIG. 12(b), so that the vertices of the cube are as close as possible to the white dots, the four vertices of the bottom surface of the cube appear to fall on a target plane, and the position and the orientation of the whole cube appear to be correct. In other words, the user may adjust the position and the orientation of the cube by dragging the white dots.

Although FIG. 12 shows five white dots are used to adjust five vertices of the cube, an actual operation is not limited thereto. For example, four, six, or seven vertices may be used, or even eight or more white dots may alternatively be used to respectively adjust eight vertices of the cube.

In FIG. 12, different sides of the cube may further be drawn in different colors, so as to distinguish different surfaces. For example, four sides of the bottom surface may be represented in blue, four sides of the top surface may be represented in red, and four sides of a side surface maybe represented in green, and the present disclosure is not limited thereto.

Figure 13:
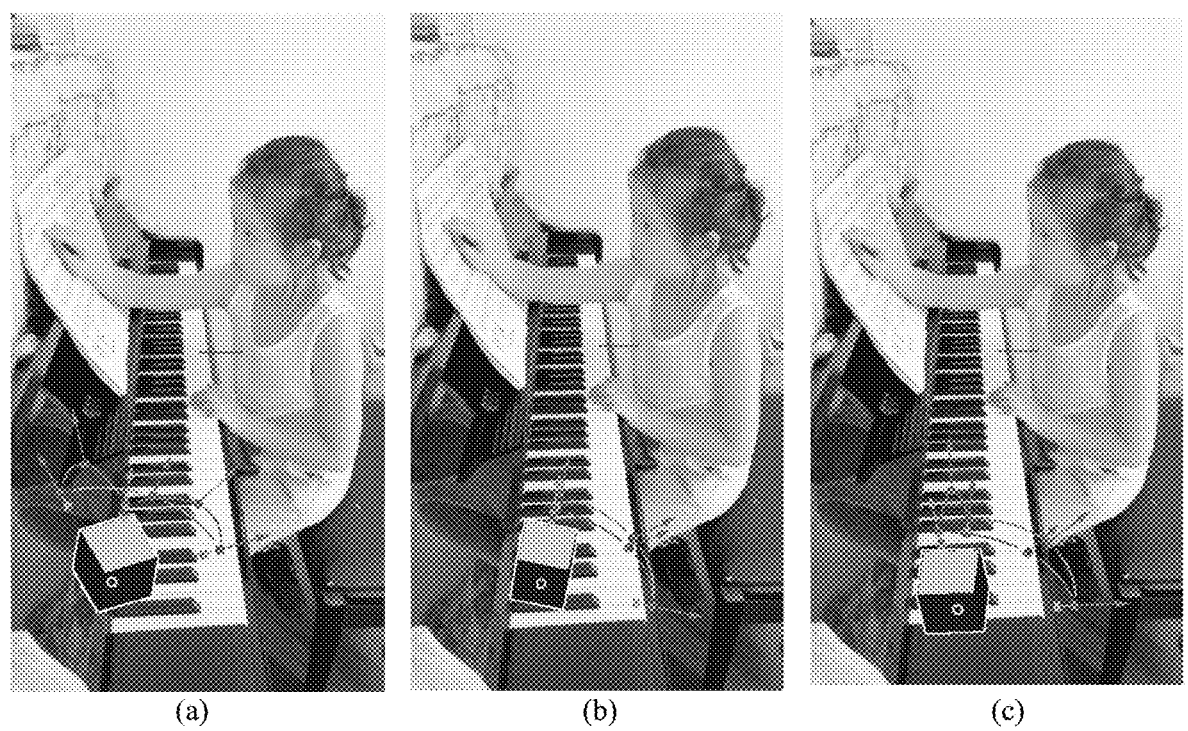
FIG. 13 is a schematic diagram of rotating a cube to control a pose of the cube according to an embodiment of the present disclosure.

FIG. 13 is a schematic diagram of rotating a cube to control a pose of the cube according to an embodiment of the present disclosure.

In addition to the manner shown in FIG. 12, the pose of the cube may alternatively be adjusted in the manner shown in FIG. 13. FIG. 13(a) shows an initial position of the cube dragged into a first frame of image. FIG. 13(b) shows that a user rotates the cube to achieve a final effect of FIG. 13(c). To be specific, four vertices of a bottom surface of the cube fall on a target plane, and the pose of the cube appears to be correct. The user may drag the cube by pressing an arrow displayed on the first frame of image with a finger or a mouse, or may rotate the cube by pressing an arc displayed on the first frame of image, to adjust the pose of the cube. Similarly, the user may also re-position the cube by sliding, tilting, or the like.

In this embodiment of the present disclosure, the pose (i.e., position and orientation) of the cube may be adjusted in a manner of manual interaction, or the pose of the cube may be automatically adjusted to be placed on the target plane B, once after the target plane B in the first frame of image is recognized through a method based on AI. A purpose of the adjustment is to adjust the pose of the cube, so that the four vertices a, b, c, d of the bottom surface of the cube fall on the target plane B. The pixel coordinates of the four vertices on the first frame of image in this case are recorded. The three-dimensional coordinates of the four vertices of the bottom surface of the cube, the pixel coordinates of the four vertices on the first frame of image, and the camera intrinsic parameter are inputted into the PnP algorithm to calculate the position and the orientation of the camera coordinate system of the first frame of image relative to the world coordinate system O.

Figure 14:
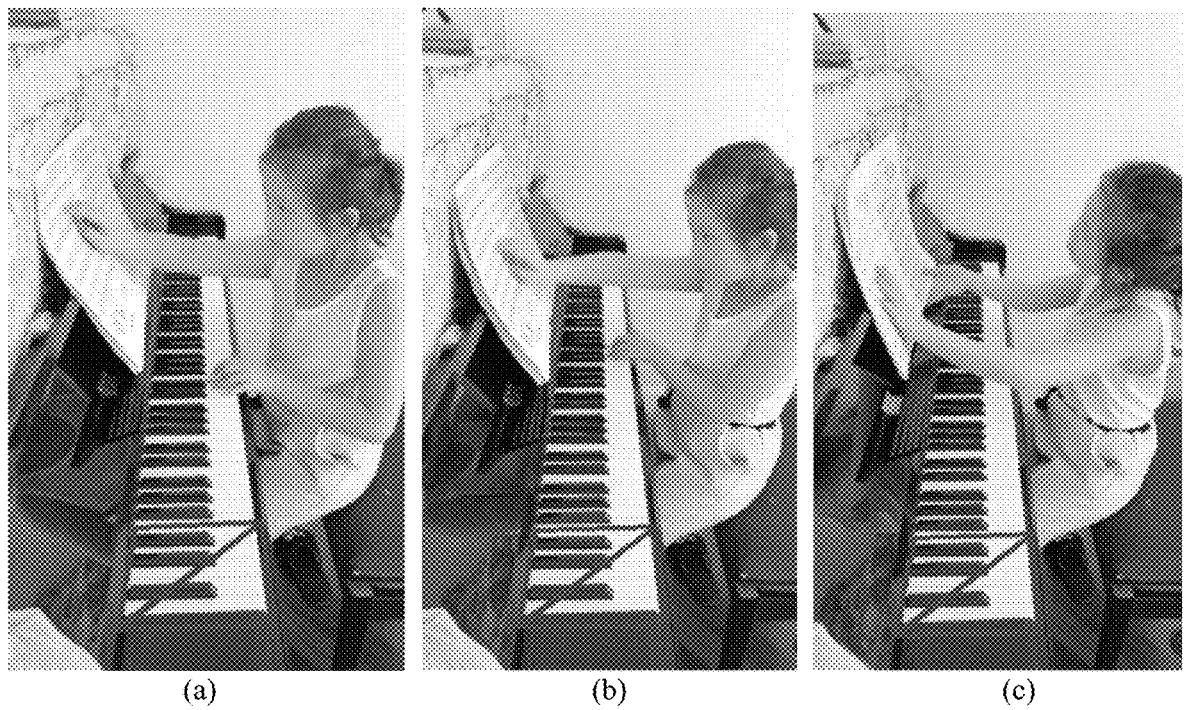
FIG. 14 is a schematic diagram of tracking a target plane where a cube is located according to an embodiment of the present disclosure.

FIG. 14 is a schematic diagram of tracking a target plane where a cube is located according to an embodiment of the present disclosure.

Assuming that the target plane is a plano plane, the plane tracking effect is shown in FIG. 14. FIG. 14(a) is assumed to be the target plane displayed on a first frame of image of a to-be-processed video. FIG. 14(b) is assumed to be the target plane displayed on a second frame of image. FIG. 14(c) is assumed to be the target plane displayed on a third frame of image. In each of FIG. 14(a), FIG. 14(b), and FIG. 14(c), the target plane is represented by a quadrilateral including two triangles.

Figure 15:
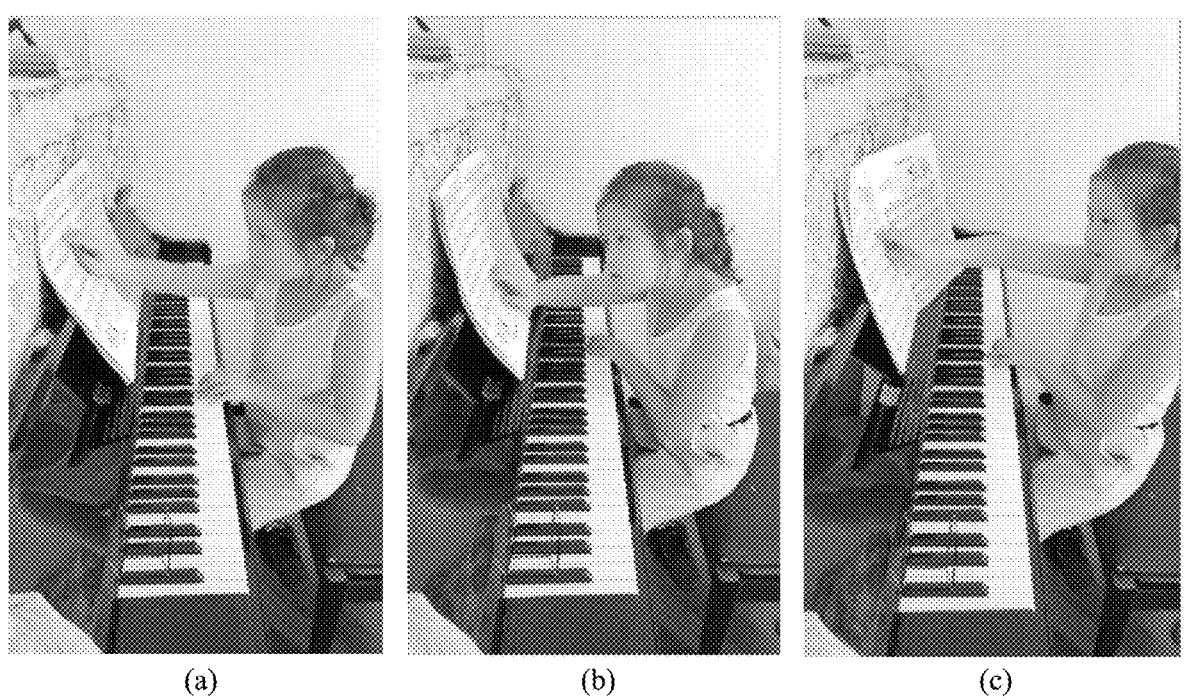
FIG. 15 is a schematic diagram of displaying a cube on each frame of image according to an embodiment of the present disclosure.

FIG. 15 is a schematic diagram of displaying a cube on each frame of image according to an embodiment of the present disclosure.

FIG. 15(a) is assumed to be the cube displayed on the first frame of image of the to-be-processed video. FIG. 15(b) is assumed to be the cube displayed on the second frame of image. FIG. 15(c) is assumed to be the cube displayed on the third frame of image.

Figure 16:
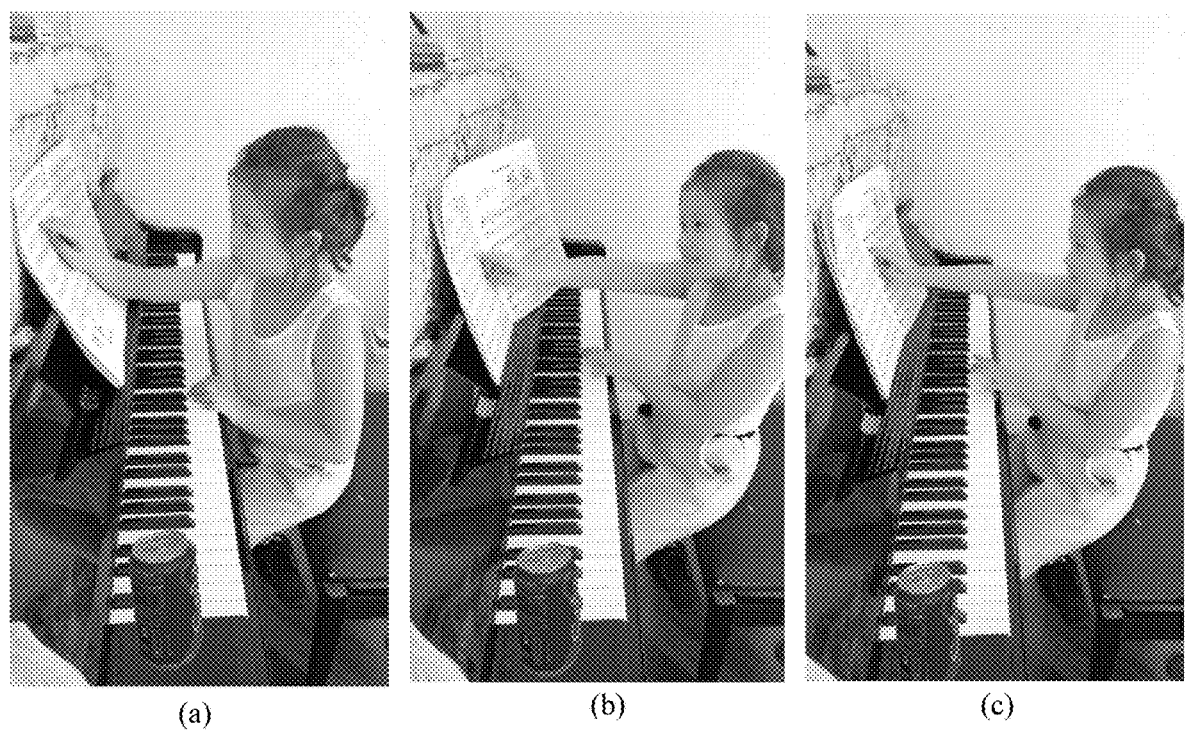
FIG. 16 is a schematic diagram of placing a three-dimensional advertisement on each frame of image according to an embodiment of the present disclosure.

FIG. 16 is a schematic diagram of placing a three-dimensional advertisement on each frame of image according to an embodiment of the present disclosure.

FIG. 16(a) is assumed to be a red cola can displayed on the first frame of image of the to-be-processed video. FIG. 16(b) is assumed to be the red cola can displayed on the second frame of image. FIG. 16(c) is assumed to be the red cola can displayed on the third frame of image.

In FIG. 12 to FIG. 16 and other embodiments of this application, the image processing is performed on the video in, for example, an image processing interface or page.

Figure 17:
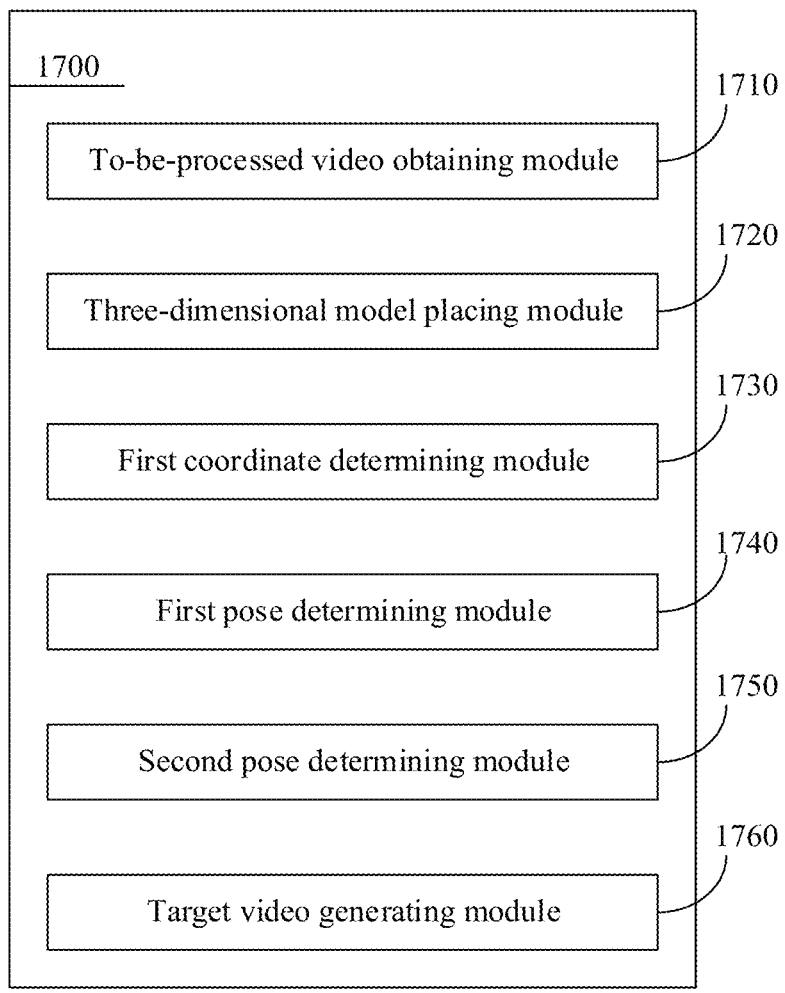
FIG. 17 is a block diagram of an image processing apparatus according to an embodiment of the present disclosure.

FIG. 17 is a block diagram of an image processing apparatus according to an embodiment of the present disclosure.

As shown in FIG. 17, an image processing apparatus 1700 provided in an embodiment of the present disclosure may include: a to-be-processed video obtaining module 1710, a three-dimensional model placing module 1720, a first coordinate determining module 1730, a first pose determining module 1740, a second pose determining module 1750, and a target video generating module 1760.

The to-be-processed video obtaining module 1710 may be configured to obtain a to-be-processed video, the to-be-processed video including m frames of images, m being a positive integer greater than or equal to 2. The three-dimensional model placing module 1720 may be configured to place a target three-dimensional model on a target plane of a first frame of image of the to-be-processed video, a plurality of feature points of a model surface of the target three-dimensional model falling on the target plane. The first coordinate determining module 1730 may be configured to determine three-dimensional coordinates of the plurality of feature points of the model surface in a world coordinate system and pixel coordinates of the plurality of feature points of the model surface on the first frame of image The first pose determining module 1740 may be configured to determine, according to the three-dimensional coordinates of the plurality of feature points of the model surface in the world coordinate system and the pixel coordinates of the plurality of feature points of the model surface on the first frame of image, a pose of a camera coordinate system of the first frame of image relative to the world coordinate system. The second pose determining module 1750 may be configured to determine and obtain, according to the target plane, the three-dimensional coordinates of the plurality of feature points of the model surface in the world coordinate system, and the pixel coordinates of the plurality of feature points of the model surface on the first frame of image, poses of camera coordinate systems of a second frame of image to an $m^{th}$ frame of image of the to-be-processed video relative to the world coordinate system. The target video generating module 1760 is configured to replace the target three-dimensional model with a target model and place the target model on the world coordinate system to generate, according to the pose of the camera coordinate system of each frame of image of the to-be-processed video relative to the world coordinate system, a target video including the target model.

In an exemplary embodiment, the second pose determining module 1750 may include: a homography matrix determining unit, which may be configured to determine a homography matrix of a target plane on a $j^{th}$ frame of image of the to-be-processed video relative to the target plane on the first frame of image as a homography matrix of the $j^{th}$ frame of image, j being a positive integer greater than or equal to 2 and less than or equal to m; a pixel coordinate determining unit, which may be configured to obtain, according to the homography matrix of the $j^{th}$ frame of image and the pixel coordinates of the plurality of feature points of the model surface on the first frame of image, pixel coordinates of the plurality of feature points of the model surface on the $j^{th}$ frame of image; and a pose determining unit, which may be configured to determine, according to a camera intrinsic parameter of the to-be-processed video, the three-dimensional coordinates of the plurality of feature points of the model surface in the world coordinate system, and the pixel coordinates of the plurality of feature points of the model surface on the $j^{th}$ frame of image, a pose of a camera coordinate system of the $j^{th}$ frame of image of the to-be-processed video relative to the world coordinate system.

In an exemplary embodiment, the target video generating module 1760 may include: a three-dimensional mapping unit, which may be configured to project the target three-dimensional model onto each of the second frame of image to the $m^{th}$ frame of image of the to-be-processed video based on the poses of the camera coordinate systems of the second frame of image to the $m^{th}$ frame of image of the to-be-processed video relative to the world coordinate system; a display model replacing unit, which may be configured to replace the target three-dimensional model with the target model and place the target model on the world coordinate system of each frame of image of the to-be-processed video; a display model projecting unit, which may be configured to project, according to the pose of the camera coordinate system of each frame of image of the to-be-processed video relative to the world coordinate system, the target model onto each frame of image of the to-be-processed video; and an image synthesizing unit, which may be configured to synthesize all the frames of images of the to-be-processed video with the target model to generate the target video.

In an exemplary embodiment, the three-dimensional model placing module 1720 may include: a three-dimensional model drag-in unit, which may be configured to add the target three-dimensional model to the first frame of image in response to an adding instruction of adding the target three-dimensional model to the first frame of image; a model surface determining unit, which may be configured to determine the model surface of the target three-dimensional model and the plurality of feature points of the model surface; and a three-dimensional model pose adjusting unit, which may be configured to adjust a pose of the target three-dimensional model so that the plurality of feature points of the model surface fall on the target plane.

In an exemplary embodiment, the three-dimensional model pose adjusting unit may include: a feature point adjusting subunit or a three-dimensional model rotating subunit. The feature point adjusting subunit may be configured to adjust the plurality of feature points of the target three-dimensional model so that the plurality of feature points of the model surface fall on the target plane. The three-dimensional rotating subunit may be configured to rotate the target three-dimensional model so that the plurality of feature points of the model surface fall on the target plane.

In an exemplary embodiment, the first coordinate determining module 1730 may include: a world coordinate system establishing unit, which may be configured to establish the world coordinate system according to the target three-dimensional model; a three-dimensional coordinate determining unit, which may be configured to determine the three-dimensional coordinates of the plurality of feature points of the model surface in the world coordinate system; and a pixel coordinate recording unit, which may be configured to record the pixel coordinates of the plurality of feature points of the model surface on the first frame of image in a case that the plurality of feature points of the model surface fall on the target plane.

In an exemplary embodiment, the target three-dimensional model may be a cube having a predetermined side length. The world coordinate system establishing unit may include: an origin determining subunit, which may be configured to use a feature point at the top left corner of the cube as an origin; and a coordinate axis determining subunit, which may be configured to use three sides of the cube that intersect the feature point at the top left corner as coordinate axes to establish the world coordinate system.

In an exemplary embodiment, the image processing apparatus 1700 may further include: a plane determining module, which may be configured to process the first frame of image by using a neural network model to obtain at least one plane on the first frame of image; and a target plane determining module, which may be configured to determine the target plane from the at least one plane in response to a plane selection instruction on the first frame of image.

For the specific implementations of the modules, units, and subunits in the image processing apparatus provided in this embodiment of the present disclosure, reference may be made to the content in the foregoing image processing method, and details are not described herein again.

Although several modules, units, or subunits of a device for action execution are mentioned in the foregoing detailed descriptions, the division is not mandatory. In practice, according to the implementations of the present disclosure, the features and functions of two or more modules, units, or subunits described above may be embodied in one module, unit, or subunit. Conversely, a module, a unit, or a subunit described above may further be divided into a plurality of modules, units, or subunits to implement functions and features.

Through descriptions of the foregoing implementations, it is easy for a person skilled in the art to understand that the exemplary implementations described herein can be implemented by software or by combining software and necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or on the network including several instructions for instructing a computer device (which may be a personal computer, a server, a mobile terminal, a network device, or the like) to execute the methods described in the implementations of the present disclosure.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for image processing, comprising:
obtaining a video comprising m frames of images, m being a positive integer greater than or equal to 2;
placing a three-dimensional (3D) model on a target plane of a first frame of the video, a plurality of feature points of a model surface of the 3D model falling on the target plane;
determining 3D coordinates of the plurality of feature points of the model surface in a world coordinate system as reference 3D coordinates, and determining pixel coordinates of the plurality of feature points of the model surface on the first frame of the video as initial pixel coordinates;
determining, according to the reference 3D coordinates and the initial pixel coordinates, a pose of a camera coordinate system of the first frame of the video relative to the world coordinate system;
for a $j^{th}$ frame selected from a second frame of the video to an $m^{th}$ frame of the video, j being an integer greater than 1 and less than or equal to m:
determining a current homography matrix as a homography matrix of a target plane on the $j^{th}$ frame of the video relative to the target plane on the first frame of the video by:
in response to j being equal to 2, determining the current homography matrix as a unit matrix; and
in response to j being greater than 2: optimizing a homography matrix of a target plane on a $(j-1)^{th}$ frame of the vide according to: a residual between a pixel value of each pixel of the $(j-1)^{th}$ frame and a corresponding pixel value of each pixel of a $(j-2)^{th}$ frame, to obtain the current homography matrix; and
determining, according to the current homography matrix and the initial pixel coordinates, pixel coordinates of the plurality of feature points of the model surface on the $j^{th}$ frame of the video;
determining, according to a camera intrinsic parameter of the video, the reference 3D coordinates, and the pixel coordinates of the plurality of feature points of the model surface on the $j^{th}$ frame of the video, a pose of a camera coordinate system of the $j^{th}$ frame of the video relative to the world coordinate system; and
replacing the 3D model with a target model and placing the target model on the world coordinate system to generate, according to the pose of the camera coordinate system of each frame of the video relative to the world coordinate system, a target video comprising the target model.

2. The method according to claim 1, wherein replacing the 3D model with the target model and placing the target model on the world coordinate system to generate the target video comprises:
for each frame of the video, replacing the 3D model with the target model and placing the target model on the world coordinate system;
projecting, according to the pose of the camera coordinate system of each frame of the video relative to the world coordinate system, the target model onto each frame of the video; and
synthesizing all the frames of the video to generate the target video comprising the target model.

3. The method according to claim 1, wherein placing the 3D model on the target plane of the first frame of the video comprises:

adding the 3D model to the first frame of the video in response to an adding instruction;

determining the model surface of the 3D model and the plurality of feature points of the model surface; and adjusting a pose of the 3D model so that the plurality of feature points of the model surface fall on the target plane.

4. The method according to claim 3, wherein adjusting the pose of the 3D model so that the plurality of feature points of the model surface fall on the target plane comprises:

adjusting the plurality of feature points of the 3D model so that the plurality of feature points of the model surface fall on the target plane; or re-positioning the 3D model so that the plurality of feature points of the model surface fall on the target plane by rotating, sliding, or tilting the 3D model.

5. The method according to claim 1, wherein determining the 3D coordinates of the plurality of feature points of the model surface in the world coordinate system and the pixel coordinates of the plurality of feature points of the model surface on the first frame of the video comprises:

establishing the world coordinate system according to the 3D model;

determining the 3D coordinates of the plurality of feature points of the model surface in the world coordinate system; and recording the pixel coordinates of the plurality of feature points of the model surface on the first frame of the video in a case that the plurality of feature points of the model surface fall on the target plane.

6. The method according to claim 5, wherein the 3D model is a cube having a predetermined side length, and establishing the world coordinate system according to the 3D model comprises:

using a feature point at a corner of the cube as an origin; and using three sides of the cube that intersect the feature point at the corner of the cube as coordinate axes to establish the world coordinate system.

7. The method according to claim 1, further comprising:

processing the first frame of the video by using a neural network model to obtain at least one plane on the first frame of the video; and determining the target plane from the at least one plane in response to a plane selection instruction on the first frame of the video.

8. A device for image processing, comprising a memory for storing instructions and a processor in communication with the memory, wherein the processor is configured to execute the instructions to cause the device to:

obtain a video comprising m frames of images, m being a positive integer greater than or equal to 2;

place a 3D model on a target plane of a first frame of the video, a plurality of feature points of a model surface of the 3D model falling on the target plane;

determine 3D coordinates of the plurality of feature points of the model surface in a world coordinate system as reference 3D coordinates, and determine pixel coordinates of the plurality of feature points of the model surface on the first frame of the video as initial pixel coordinates;

determine, according to the reference 3D coordinates and the initial pixel coordinates, a pose of a camera coordinate system of the first frame of the video relative to the world coordinate system;

for a $j^{th}$ frame selected from a second frame of the video to an $m^{th}$ frame of the video, j being an integer greater than 1 and less than or equal to m:

determine a current homography matrix as a homography matrix of a target plane on the $j^{th}$ frame of the video relative to the target plane on the first frame of the video by:

in response to j being equal to 2, determine the current homography matrix as a unit matrix; and in response to j being greater than 2: optimize a homography matrix of a target plane on a $(j-1)^{th}$ frame of the vide according to: a residual between a pixel value of each pixel of the $(j-1)^{th}$ frame and a corresponding pixel value of each pixel of a $(j-2)^{th}$ frame, to obtain the current homography matrix; and determine, according to the current homography matrix and the initial pixel coordinates, pixel coordinates of the plurality of feature points of the model surface on the $j^{th}$ frame of the video;

determine, according to a camera intrinsic parameter of the video, the reference 3D coordinates, and the pixel coordinates of the plurality of feature points of the model surface on the $j^{th}$ frame of the video, a pose of a camera coordinate system of the $j^{th}$ frame of the video relative to the world coordinate system; and replace the 3D model with a target model and placing the target model on the world coordinate system to generate, according to the pose of the camera coordinate system of each frame of the video relative to the world coordinate system, a target video comprising the target model.

9. The device according to claim 8, wherein the processor, when executing the instructions to cause the device to replace the 3D model with the target model and placing the target model on the world coordinate system to generate the target video, is configured to cause the device to:

for each frame of the video, replace the 3D model with the target model and place the target model on the world coordinate system;

project, according to the pose of the camera coordinate system of each frame of the video relative to the world coordinate system, the target model onto each frame of the video; and synthesize all the frames of the video to generate the target video comprising the target model.

10. The device according to claim 8, wherein the processor, when executing the instructions to cause the device to place the 3D model on the target plane of the first frame of the video, is configured to cause the device to:

add the 3D model to the first frame of the video in response to an adding instruction;

determine the model surface of the 3D model and the plurality of feature points of the model surface; and adjust a pose of the 3D model so that the plurality of feature points of the model surface fall on the target plane.

11. The device according to claim 10, wherein the processor, when executing the instructions to cause the device to adjust the pose of the 3D model so that the plurality of feature points of the model surface fall on the target plane, is configured to cause the device to:

adjust the plurality of feature points of the 3D model so that the plurality of feature points of the model surface fall on the target plane; or re-position the 3D model so that the plurality of feature points of the model surface fall on the target plane by rotating, sliding, or tilting the 3D model.

12. The device according to claim 8, wherein the processor, when executing the instructions to cause the device to determine the 3D coordinates of the plurality of feature points of the model surface in the world coordinate system and the pixel coordinates of the plurality of feature points of the model surface on the first frame of the video, is configured to cause the device to:
- establish the world coordinate system according to the 3D model;
- determine the 3D coordinates of the plurality of feature points of the model surface in the world coordinate system; and
- record the pixel coordinates of the plurality of feature points of the model surface on the first frame of the video in a case that the plurality of feature points of the model surface fall on the target plane.

13. The device according to claim 12, wherein the 3D model is a cube having a predetermined side length, and wherein the processor, when executing the instructions to cause the device to establish the world coordinate system according to the 3D model, is configured to cause the device to:
- use a feature point at a corner of the cube as an origin; and
- use three sides of the cube that intersect the feature point at the corner of the cube as coordinate axes to establish the world coordinate system.

14. The device according to claim 8, wherein the processor, when executing the instructions, is configured to further cause the device to:
- process the first frame of the video by using a neural network model to obtain at least one plane on the first frame of the video; and
- determine the target plane from the at least one plane in response to a plane selection instruction on the first frame of the video.

15. A non-transitory storage medium for storing computer readable instructions, the computer readable instructions, when executed by a processor, causing the processor to:
- obtain a video comprising m frames of images, m being a positive integer greater than or equal to 2;
- place a 3D model on a target plane of a first frame of the video, a plurality of feature points of a model surface of the 3D model falling on the target plane;
- determine 3D coordinates of the plurality of feature points of the model surface in a world coordinate system as reference 3D coordinates, and determine pixel coordinates of the plurality of feature points of the model surface on the first frame of the video as initial pixel coordinates;
- determine, according to the reference 3D coordinates and the initial pixel coordinates, a pose of a camera coordinate system of the first frame of the video relative to the world coordinate system;
- for a $j^{th}$ frame selected from a second frame of the video to an $m^{th}$ frame of the video, j being an integer greater than 1 and less than or equal to m:
  - determine a current homography matrix as a homography matrix of a target plane on the $j^{th}$ frame of the video relative to the target plane on the first frame of the video by:
    - in response to j being equal to 2, determine the current homography matrix as a unit matrix; and
    - in response to j being greater than 2: optimize a homography matrix of a target plane on a $(j-1)^{th}$ frame of the vide according to: a residual between a pixel value of each pixel of the $(j-1)^{th}$ frame and a corresponding pixel value of each pixel of a $(j-2)^{th}$ frame, to obtain the current homography matrix; and
  - determine, according to the current homography matrix and the initial pixel coordinates, pixel coordinates of the plurality of feature points of the model surface on the $j^{th}$ frame of the video;
  - determine, according to a camera intrinsic parameter of the video, the reference 3D coordinates, and the pixel coordinates of the plurality of feature points of the model surface on the $j^{th}$ frame of the video, a pose of a camera coordinate system of the $j^{th}$ frame of the video relative to the world coordinate system; and
- replace the 3D model with a target model and placing the target model on the world coordinate system to generate, according to the pose of the camera coordinate system of each frame of the video relative to the world coordinate system, a target video comprising the target model.

16. The non-transitory computer readable storage medium according to claim 15, wherein, when the computer readable instructions cause the processor to replace the 3D model with the target model and placing the target model on the world coordinate system to generate the target video, the computer readable instructions cause the processor to:
- For each frame of the video, replace the 3D model with the target model and place the target model on the world coordinate system;
- project, according to the pose of the camera coordinate system of each frame of the video relative to the world coordinate system, the target model onto each frame of the video; and
- synthesize all the frames of the video to generate the target video comprising the target model.

17. The non-transitory computer readable storage medium according to claim 15, wherein, when the computer readable instructions cause the processor to place the 3D model on the target plane of the first frame of the video, the computer readable instructions cause the processor to:
- add the 3D model to the first frame of the video in response to an adding instruction;
- determine the model surface of the 3D model and the plurality of feature points of the model surface; and
- adjust a pose of the 3D model so that the plurality of feature points of the model surface fall on the target plane.

* * * * *